United States Patent
Wu et al.

(10) Patent No.: US 12,480,148 B2
(45) Date of Patent: Nov. 25, 2025

(54) METHOD FOR PREPARING (S)-1,2,3,4-TETRAHYDROISOQUINOLINE-1 CARBOXYLIC ACID AND DERIVATIVES THEREOF

(71) Applicants: Tongli Biomedical Co., Ltd., Suzhou (CN); Zhejiang University, Hangzhou (CN)

(72) Inventors: Jianping Wu, Suzhou (CN); Shuyun Ju, Suzhou (CN); Junwei Shi, Suzhou (CN); Lirong Yang, Suzhou (CN); Mingxin Qian, Suzhou (CN)

(73) Assignees: Tongli Biomedical Co., Ltd., Suzhou (CN); Zhejiang University, Hangzhou (CN)

( * ) Notice: Subject to any disclaimer, the term of this patent is extended or adjusted under 35 U.S.C. 154(b) by 676 days.

(21) Appl. No.: 17/268,455

(22) PCT Filed: Apr. 23, 2019

(86) PCT No.: PCT/CN2019/083813
§ 371 (c)(1),
(2) Date: Sep. 8, 2022

(87) PCT Pub. No.: WO2020/034660
PCT Pub. Date: Feb. 20, 2020

(65) Prior Publication Data
US 2023/0107679 A1    Apr. 6, 2023

(30) Foreign Application Priority Data
Aug. 16, 2018    (CN) .......................... 201810933649.7

(51) Int. Cl.
*C12P 17/12*    (2006.01)
*C07D 217/26*    (2006.01)
*C12N 15/70*    (2006.01)
*C12P 41/00*    (2006.01)

(52) U.S. Cl.
CPC ............ *C12P 17/12* (2013.01); *C07D 217/26* (2013.01); *C12N 15/70* (2013.01); *C12P 41/00* (2013.01); *C07B 2200/07* (2013.01)

(58) Field of Classification Search
CPC ...................................................... C12P 17/12
USPC ....................................................... 514/307
See application file for complete search history.

(56) References Cited

FOREIGN PATENT DOCUMENTS

| CN | 104557911 A | 4/2015 |
| CN | 104557911 B | 8/2016 |
| CN | 109971802 * | 7/2019 |

OTHER PUBLICATIONS

Agirre et al., Chem Asian J. (2019) vol. 14(1): 44-66 (published on line Oct. 9, 2018).*
English Translation of International Search Report of priority application No. PCT/CN2019/083813; Issued Jul. 31, 209; 3 pages.
English Translation of Written Opinion of priority application No. PCT/CN2019/083813; Issued Jul. 31, 2019; 3 pages.
Muramatsu. H. et al. "The putative malate/lactate dehydrogenase from Pseudomonas putida is an NADPH-dependent deltal-piperideine-2-carboxylate/deltal-pyrroline-2- carboxylate reductase involved in the catabolismof D-lysine and D-proline." Journal of Biological Chemistry, Vol. vol. 280, No. 7, 7 pages, 2005, 5329-5335.
Paal. Tihamer A. et al. "Directed (R)- or (S)-Selective Dynamic Kinetic Enzymatic Hydrolysis of 1,2,3,4-Tetrahydroisoquinoline-1-carboxylic Esters"; European Journal of Organic Chemistry, Wiley-VCH Verlag Gmbh & Co. KGaA, Weinheim, 2008, 5269-5276, 8 pages.
Hu. Longqin et al. "Discovery of a small-molecule inhibitor and cellular probe of Keap1-Nrf2 protein-proteininteraction" Bioorganic & Medicinal Chemistry Letters, 2013 Elsevier Ltd., 3039-3043, 5 pages.
English Translation of First Office Action of priority application No. CN201810933649.7; Issued Dec. 3, 2020; 5 pages.
English Translation of WO2015055127; Publication of PCT/CN2014/088713; (R)-Praziquantel Preparation Method; Issued Apr. 23, 2015; 6 pages.
Pollegioni. Loredano et al. "Properties and applications of microbial D-amino acid oxidases: current state and perspectives"; Springer-Verlag 2007; Appl Microbiol Biotechnol, 2008; 78:1-16; 16 pages.

(Continued)

*Primary Examiner* — Taofiq A Solola
(74) *Attorney, Agent, or Firm* — Peter L. Brewer; Thrive IP

(57) ABSTRACT

Disclosed is a method for preparing (S)-1,2,3,4-tetrahydroisoquinoline-1-carboxylic acid and derivatives thereof, comprising: taking a racemate of a compound represented by Formula (I) or a racemate of a salt of the compound represented by Formula (I) as a substrate, and making a R-isomer of the compound represented by Formula (I) in the substrate react under the catalysis of oxidative dehydrogenase to generate imino acid represented by formula (II); and converting the imino acid represented by Formula (II) into an S-isomer of the compound represented by Formula (I) in the presence of pipecolic acid reductase and a coenzyme capable of supplying hydrogen anions. The process has mild reaction conditions, strong stereoselectivity, high reaction efficiency, and high conversion rate.

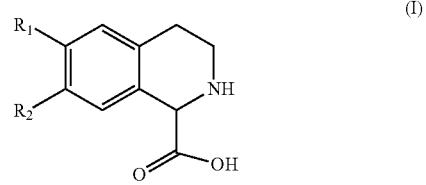

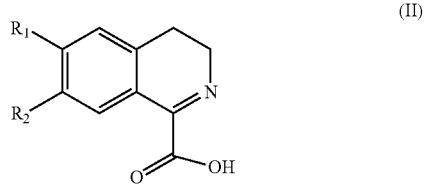

14 Claims, 2 Drawing Sheets
Specification includes a Sequence Listing.

(56) References Cited

OTHER PUBLICATIONS

Bulyszko. Ilona et al. "Synthesis of (+)-6,7-Dimethoxy-1,2,3,4-tetrahydroisoquinoline-1-carboxylic Acid, a Diastereoselective Approach"; European Journal of Organic Chemistry, Wiley-VCH Verlag Gmbh & Co. KGaA, Weinheim, 2015, 383-388; 6 pages.
KURATA Kaoruko, et al. "Synthesis of Optically Pure (R)- and (S)-Tetrahydroisoquinoline-1-and -3-Carboxylic Acids"; Georg Thieme Verlag Stuttgart, New York; Synthesis, 2015, 47, 1238-1244; 7 pages.
English translation of application CN 104557911 A; Tongli Biomedical Co., Ltd; Published Apr. 29, 2015; 12 pages.
English translation of CN 104557911 B; Tongli Biomedical Co., Ltd; Published Aug. 31, 2016; 12 pages.

\* cited by examiner

METHOD FOR PREPARING (S)-1,2,3,4-TETRAHYDROISOQUINOLINE-1 CARBOXYLIC ACID AND DERIVATIVES THEREOF

CROSS REFERENCE TO RELATED APPLICATIONS

This application claims the benefit of CN 2018109336497 filed Aug. 16, 2018.

This application also claims the benefit of PCT/CN2019/083813 filed Apr. 23, 2019. That application is titled "Method for Preparing (S)-1,2,3,4-Tetrahydroisoquinoline 1-Carboxylic Acid and Derivatives Thereof."

Each of these applications in incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

TECHNICAL FIELD OF THE INVENTION

The present disclosure belongs to the field of biocatalysis technology, in particular, relates to a method for preparing (S)-1,2,3,4-tetrahydroisoquinoline-1-carboxylic acid and derivatives thereof.

BACKGROUND OF THE INVENTION 1,2,3,4-tetrahydroisoquinoline compounds are a very important class of pharmaceutical intermediates, which are widely used in the synthesis of multiple drugs. In recent years, Hu et al. (Discovery of a small-molecule inhibitor and cellular probe of Keap1-Nrf2 protein-protein interaction [J]. *BioorgMed Chem Lett,* 2013, 23(10): 3039-43) used (S)-1,2,3,4-tetrahydroisoquinoline-1-carboxylic acid as the starting compound to synthesize an inhibitor targeting Kelch-like ECH-associated protein 1 (Keap 1), which is expected to be used in treatment and prevention of cancer, diabetes, Alzheimer's disease and Parkinson's disease, etc. However, most of isoquinoline alkaloids having medical value have 6,7-dimethoxy (such as papaverine and emetine), which is beneficial to reduce the hydrophobicity of drug molecules and improve druggability, such as 6,7-dimethoxy-1,2,3,4-tetrahydroisoquinoline-1-carboxylic acid.

In the prior art, there are two kinds of method to prepare optically pure (S)-1,2,3,4-tetrahydroisoquinoline-1-carboxylic acid or (S)-6,7-dimethoxy-1,2,3,4-tetrahydroisoquinoline-1-carboxylic acid: chemical chiral synthesis and biocatalytic chiral resolution.

The chemical chiral synthesis method starts from chiral raw materials to synthesize (S)-1,2,3,4-tetrahydroisoquinoline-1-carboxylic acid, for example, Kurata et al. used optically pure alkene isoquinoline as the starting material to asymmetrically synthesize (S)-1,2,3,4-tetrahydroisoquinoline-1-carboxylic acid in a three-step sequence of ozonolysis, $NaBH_4$ in-situ reduction, tetramethyl-piperidine N-oxide (TEMPO) oxidation, and trifluoroacetic acid-mediated deprotection of N-tert-butoxycarbonyl (Synthesis of Optically Pure (R)- and (S)-Tetrahydroisoquinoline-1- and -3-Carboxylic Acids [J]. Synthesis, 2015, 47(09): 1238-44). This method has a low yield and complicated steps, and is not suitable for industrialized application. Bulyszko et al. employed Petasis synthesis and Pomeranz-Fritsch-Bobbitt synthesis to diastereoselectively synthesize (S)-6,7-dimethoxy-1,2,3,4-tetrahydroisoquinoline-1-carboxylic acid, with ee value of 90% (Synthesis of (+)-6,7-Dimethoxy-1,2,3,4-tetrahydroisoquinoline-1-carboxylic Acid, a Diastereoselective Approach [J]. *European Journal of Organic Chemistry,* 2015, 2015(2): 383-8).

By contrast, the biocatalysis has advantages such as strong stereoselectivity, mild reaction conditions, which is a potential advantageous method for preparing (S)-1,2,3,4-tetrahydroisoquinoline-1-carboxylic acid or derivatives thereof. Pail et al. synthesized (S)-6,7-dimethoxy-1,2,3,4-tetrahydroisoquinoline-1-carboxylic acid through subtilisin-catalysed dynamic kinetic resolution of 6,7-dimethoxy-1,2,3,4-tetrahydroisoquinoline-1-carboxylic acid, with 53.46 g/L substrate, 80 mg/mL immobilized enzyme, at 3° C. and pH 8.5 for 3 days, in a yield 92%, ee value of product 93% (Directed (R)- or (S)-Selective Dynamic Kinetic Enzymatic Hydrolysis of 1,2,3,4-Tetrahydroisoquinoline-1-carboxylic Esters [J]. *European Journal of Organic Chemistry,* 2008, 2008(31): 5269-76). This method has mild reaction conditions, strong stereoselectivity, and a relatively simple process, however, the optical purity of the products needs to be improved.

SUMMARY OF THE INVENTION

The present disclosure is aimed to solve the shortage of the prior art, and provide a novel method for preparing (S)-1,2,3,4-tetrahydroisoquinoline-1-carboxylic acid and derivatives thereof.

To achieve the above purpose, the technical solution employed by the present disclosure is as follows:

A method for preparing an S-isomer of a compound represented by Formula (I),

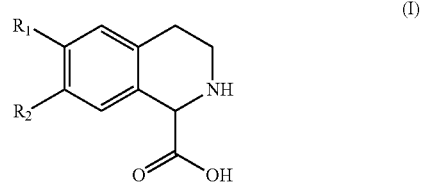

in Formula (I), $R_1$ and $R_2$ are independently selected from the group consisting of hydrogen, $C_1$-$C_6$ alkyl, $C_1$-$C_6$ alkoxy, and the method comprises the following steps:
taking a racemate of a compound represented by Formula (I) or a racemate of a salt of the compound represented by Formula (I) as a substrate, and making a R-isomer of the compound represented by Formula (I) in the substrate react under the catalysis of oxidative dehydrogenase to generate imino acid represented by formula (II);

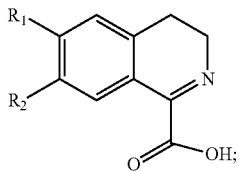

converting the imino acid represented by Formula (II) into an S-isomer of the compound represented by Formula (I) in the presence of pipecolic acid reductase and a coenzyme capable of supplying hydrogen anions.

According to some preferred aspects of the present disclosure, in Formula (I), $R_1$ and $R_2$ are independently selected from the group consisting of hydrogen, methyl, ethyl, isopropyl, methoxy, or ethoxy.

According to some preferred aspects of the present disclosure, the salt is a one-valence salt, specifically, preferably is an alkali metal salt or ammonium salt, wherein, the alkali metal salt may be for example a lithium salt, a sodium salt, or a potassium salt.

According to some preferred aspects of the present disclosure, an S-isomer of the compound represented by Formula (I) is (S)-1,2,3,4-tetrahydroisoquinoline-1-carboxylic acid or (S)-6,7-dimethoxy-1,2,3,4-tetrahydroisoquinoline-1-carboxylic acid.

According to the present disclosure, the oxidative dehydrogenase is an enzyme capable of selectively catalyzing the R-isomer of the compound represented by Formula (I), with a selectivity greater than or equal to 80%, preferably greater than or equal to 90%.

According to some preferred aspects of the present disclosure, the oxidative dehydrogenase is D-amino acid oxidase.

According to the present disclosure, the D-amino acid oxidase is selected from the group consisting of D-amino acid oxidase or its mutants derived from *Trigonopsis variabilis* CBS 4095 or other D-amino acid oxidase whose amino acid sequence homology is greater than 80% therewith, D-amino acid oxidase or its mutants derived from *Fusarium graminearum* CS3005 or other D-amino acid oxidase whose amino acid sequence homology is greater than 80% therewith, D-amino acid oxidase or its mutants derived from *Fusarium poae* 2516 or other D-amino acid oxidase whose amino acid sequence homology is greater than 80% therewith, D-amino acid oxidase or its mutants derived from *Fusarium solani* M-0718 or other D-amino acid oxidase whose amino acid sequence homology is greater than 80% therewith, combinations thereof.

Preferably, the D-amino acid oxidase has an amino acid sequence as shown in SEQ ID NO. 1, SEQ ID NO. 2, SEQ ID NO. 3 or SEQ ID NO. 4.

According to some specific and preferred aspects of the present disclosure, the added amount of the D-amino acid oxidase is based on the wet weight of cells after centrifugation at 8000 rpm for 10 min, and the added amount of the cells is 1 to 5% of the weight of the reaction system.

According to some specific and preferred aspects of the present disclosure, the use form of the D-amino acid oxidase is unorganized D-amino acid oxidase, crude enzyme containing unorganized D-amino acid oxidase, pure D-amino acid oxidase, immobilized D-amino acid oxidase, or cells intracellularly expressing D-amino acid oxidase.

Further, the cell is an engineering bacteria expressing D-amino acid oxidase and containing an expression vector pET-28a(+), and a host cell of the engineering bacteria is *E. coli* BL21(DE3); wherein, the D-amino acid oxidase gene is connected to the expression vector pET-28a(+).

According to the present disclosure, the pipecolic acid reductase is selected from the group consisting of pipecolic acid reductase or its mutants derived from *Pseudomonas putida* KT2440 or other pipecolic acid reductase whose amino acid sequence homology is greater than 80% therewith, pipecolic acid reductase or its mutants derived from *Pseudomonas aeruginosa* PAO1 or other pipecolic acid reductase whose amino acid sequence homology is greater than 80% therewith, pipecolic acid reductase or its mutants derived from *Pseudomonas fluorescens* Pf0-1 or other pipecolic acid reductase whose amino acid sequence homology is greater than 80% therewith, pipecolic acid reductase or its mutants derived from *Pseudomonas entomophila* str. L48 or other pipecolic acid reductase whose amino acid sequence homology is greater than 80% therewith, combinations thereof.

Preferably, the pipecolic acid reductase has an amino acid sequence as shown in SEQ ID NO. 5, SEQ ID NO. 6, SEQ ID NO. 7 or SEQ ID NO. 8.

According to some specific and preferred aspects of the present disclosure, the added amount of the pipecolic acid reductase is based on the wet weight of cells after centrifugation at 4000 rpm for 10 min, and the added amount of the cells is 1 to 5% of the weight of the reaction system.

According to some specific and preferred aspects of the present disclosure, the use form of the pipecolic acid reductase is unorganized pipecolic acid reductase, crude enzyme containing unorganized pipecolic acid reductase, pure pipecolic acid reductase, immobilized pipecolic acid reductase, or cells intracellularly expressing pipecolic acid reductase.

Further, the cell is an engineering bacteria expressing pipecolic acid reductase and containing an expression vector pET-28a(+), and a host cell of the engineering bacteria is *E. coli* BL21(DE3); wherein, the pipecolic acid reductase gene is connected to the expression vector pET-28a(+).

According to some preferred aspects of the present disclosure, the coenzyme capable of supplying hydrogen anions is NADH and/or NADPH.

According to some preferred aspects of the present disclosure, the reaction to generate imino acid is also carried out in the presence of flavin adenine dinucleotide (FAD). The reaction being carried out in the presence of FAD, contributes to improve the conversion rate. Further, FAD equivalents is equal to or in excess of the substrate equivalents. In general, the prepared crude D-amino acid oxidase already has enough FAD, and in the case of directly using the crude enzyme, there is no need to add additional FAD. In the case of using pure D-amino acid oxidase, an appropriate amount of FAD can be added as needed.

According to some preferred aspects of the present disclosure, the reaction to generate imino acid is also carried out in the presence of catalase.

According to some specific and preferred aspects of the present disclosure, the reaction to generate imino acid is also carried out at a setting temperature in an aerobic environment.

According to some preferred aspects of the present disclosure, the setting temperature ranges from 20 to 70° C.

More preferably, the setting temperature ranges from 20 to 50° C. Further preferably, the setting temperature ranges from 30 to 40° C.

According to some specific and preferred aspects of the present disclosure, the implementation process of the method comprises: first building a reaction system, then controlling the reaction system to react at a setting temperature in an aerobic environment, in which the reaction system comprises the substrate, the oxidative dehydrogenation, the pipecolic acid reductase, the coenzyme, a coenzyme regeneration system and a solvent, the reaction system selectively comprises a pH buffer and/or pH regulator, the coenzyme comprises NAD$^+$ (oxidized form of nicotinamide adenine dinucleotide) and/or NADH (reduced form of nicotinamide adenine dinucleotide), or, the coenzyme comprises NADP$^+$ (oxidized form of nicotinamide adenine dinucleotide phosphate) and/or NADPH (reduced nicotinamide adenine dinucleotide phosphate).

According to some preferred aspects of the present disclosure, the pH of the reaction system is controlled to be 6 to 9. More preferably, the pH of the reaction system is controlled to be 7 to 8.5.

According to some preferred aspects of the present disclosure, the concentration of the initial substrate in the reaction system is controlled to be 1 to 20 g/L. More preferably, the concentration of the initial substrate in the reaction system is controlled to be 1 to 20 g/L. According to a specific aspect of the present disclosure, the concentration of the initial substrate in the reaction system is controlled to be 5 g/L.

According to a specific and preferred aspect of the present disclosure, the pH buffer is phosphate, which can be dissolved in water to prepare a phosphate buffer solution.

According to some preferred aspects of the present disclosure, the pH regulator is ammonia, alkali metal hydroxide or aqueous solution thereof.

According to a specific and preferred aspect of the present disclosure, the pH regulator is 20 wt % to 35 wt % ammonia.

According to another specific aspect of the present disclosure, the pH regulator is aqueous solution of sodium hydroxide or potassium hydroxide.

According to some specific and preferred aspects of the present disclosure, the added amount of the coenzyme is 1‰ to 1% of the substrate concentration.

According to the present disclosure, the coenzyme regeneration system comprises a coenzyme regeneration enzyme and a coenzyme regeneration substrate.

According to some preferred aspects of the present disclosure, the coenzyme regeneration enzyme is glucose dehydrogenase, and the coenzyme regeneration substrate is glucose; or the coenzyme regeneration enzyme is alcohol dehydrogenase, and the coenzyme regeneration substrate is isopropanol. According to a specific aspect of the present disclosure, the glucose specifically uses D-glucose.

According to a specific aspect of the present disclosure, the glucose dehydrogenase is derived from *Bacillus subtilis* 168; and/or, the alcohol dehydrogenase is derived from *Lactobscillus kefir* DSM20587.

Preferably, the glucose dehydrogenase has an amino acid sequence as shown in SEQ ID NO. 9.

Preferably, the alcohol dehydrogenase has an amino acid sequence as shown in SEQ ID NO. 10.

According to some preferred aspects of the present disclosure, the reaction system further comprises catalase.

According to some preferred aspects of the present disclosure, the catalase is bovine liver catalase lyophilized powder. According to a specific aspect of the present disclosure, the enzyme activity of the bovine liver catalase lyophilized powder is 4000 U/mg.

According to some preferred aspects of the present disclosure, a ratio of enzyme activities of the catalase and the oxidative dehydrogenase is (100 to 400): 1.

According to some preferred aspects of the present disclosure, the reaction system further comprises flavin adenine dinucleotide.

According to some specific and preferred aspects of the present disclosure, the method further comprises a separation step.

According to the present disclosure, the separation step comprises: adjusting the pH of the reaction system after the reaction to 5.0-6.0, heating to denature and precipitate proteins, vacuum filtering, concentrating the filtrate, cooling and crystallizing, and drying to give an S-isomer of the compound represented by Formula (I).

Due to the implementation of the above technical solutions, the present disclosure has the following beneficial effects over the prior art:

The present disclosure finds out that in the co-presence of pipecolic acid reductase and a coenzyme capable of supplying hydrogen anions, the imino acid can be efficiently converted into the S-isomer of the compound represented by Formula (I), which has good selectivity, high yield, mild reaction conditions, and a relatively simple process, and the ee value of the S-isomer with respect to the R-isomer in the prepared product is >99%.

BRIEF DESCRIPTION OF THE DRAWINGS

For more clearly explaining the technical solutions of the present disclosure, the accompanying graphs are used to describe embodiments. The below described drawings merely show a part of the embodiments of the present disclosure, and those skilled in the art can obtain other drawings according to the accompanying drawings without creative work.

Figure 2:
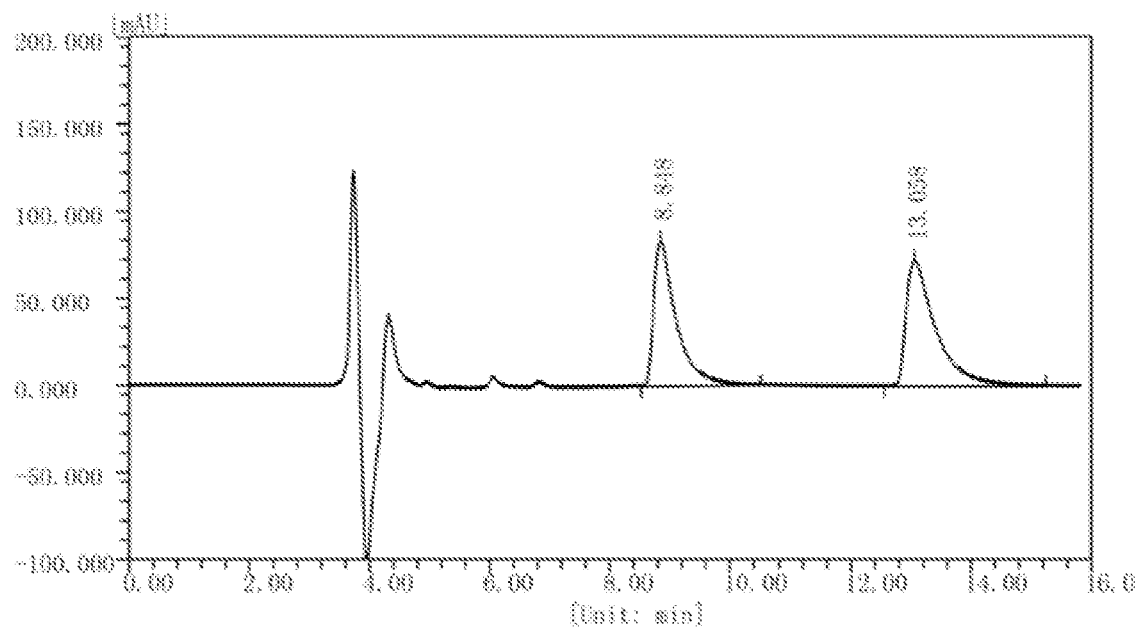
Figure 3:
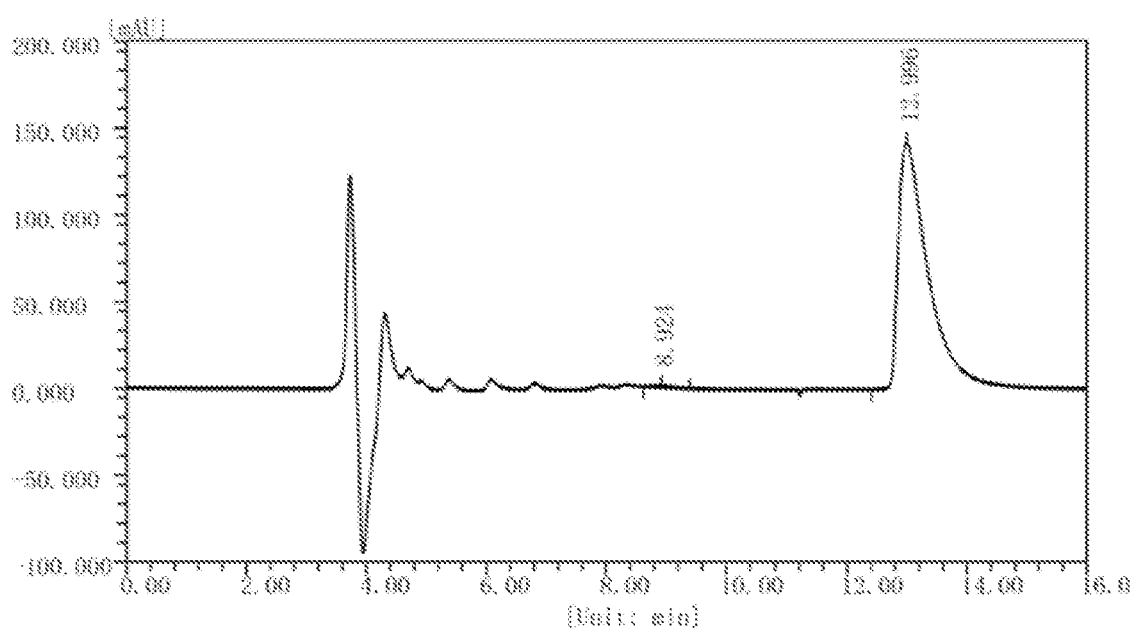

in which, the retention time of 8.810 min is (R)-1,2,3,4-tetrahydroisoquinoline-1-carboxylic acid; the retention time of 12.685 min is (S)-1,2,3,4-tetrahydroisoquinoline-1-carboxylic acid;

FIG. 2 is a HPLC spectrum of a sample taken at 0 hours in the reaction system in Embodiment 3;

FIG. 3 is a HPLC spectrum of a sample taken after 16 hours of reaction in Embodiment 3.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure. Further, the technical features involved in the various embodiments of the present disclosure described below may be combined with each other as long as they do not conflict with each other.

The present disclosure provides a novel method for preparing (S)-1,2,3,4-tetrahydroisoquinoline-1-carboxylic acid and derivatives thereof, and this method has advantages such as mild reaction conditions, strong stereoselectivity, high reaction efficiency and high yield, and has an industrialized application prospect.

According to a specific aspect of the present disclosure, the method takes racemic 1,2,3,4-tetrahydroisoquinoline-1-carboxylic acid or racemic 6,7-dimethoxy-1,2,3,4-tetrahydroisoquinoline-1-carboxylic acid as a substrate, and obtains (S)-1,2,3,4-tetrahydroisoquinoline-1-carboxylic acid or (S)-6,7-dimethoxy-1,2,3,4-tetrahydroisoquinoline-1-carboxylic acid through the catalysis of a multienzyme system, and the multienzyme system consists of oxidase dehydrogenase (preferably D-amino acid oxidase), catalase, pipecolic acid reductase and coenzyme (preferably $NADP^+$ and/or NADPH), coenzyme regeneration system, etc.

The specific principle is: racemic 1,2,3,4-tetrahydroisoquinoline-1-carboxylic acid or racemic 6,7-dimethoxy-1,2,3,4-tetrahydroisoquinoline-1-carboxylic acid is taken as a substrate, the stereoselectivity of the D-amino acid oxidase is utilized to catalyze the oxidative dehydrogenation of the (R)-1,2,3,4-tetrahydroisoquinoline-1-carboxylic acid or (R)-6,7-dimethoxy-1,2,3,4-tetrahydroisoquinoline-1-carboxylic acid to generate imino acid, and the (S)-1,2,3,4-tetrahydroisoquinoline-1-carboxylic acid or (S)-6,7-dimethoxy-1,2,3,4-tetrahydroisoquinoline-1-carboxylic acid is basically not been catalyzed and remained in the reaction system. The hydrogen peroxide produced during the reaction process is catalytically decomposed into water and oxygen through catalase. The imino acid is asymmetrically reduced into (S)-1,2,3,4-tetrahydroisoquinoline-1-carboxylic acid or (S)-6,7-dimethoxy-1,2,3,4-tetrahydroisoquinoline-1-carboxylic acid through pipecolic acid reductase. During this process, the reduced coenzyme II, namely reduced nicotinamide adenine dinucleotide phosphate (NADPH) is oxidized to $NADP^m$ (oxidized form of nicotinamide adenine dinucleotide phosphate), and the $NADP^m$ is reduced to NADPH through the coenzyme regeneration system.

The course of reaction is as follows:

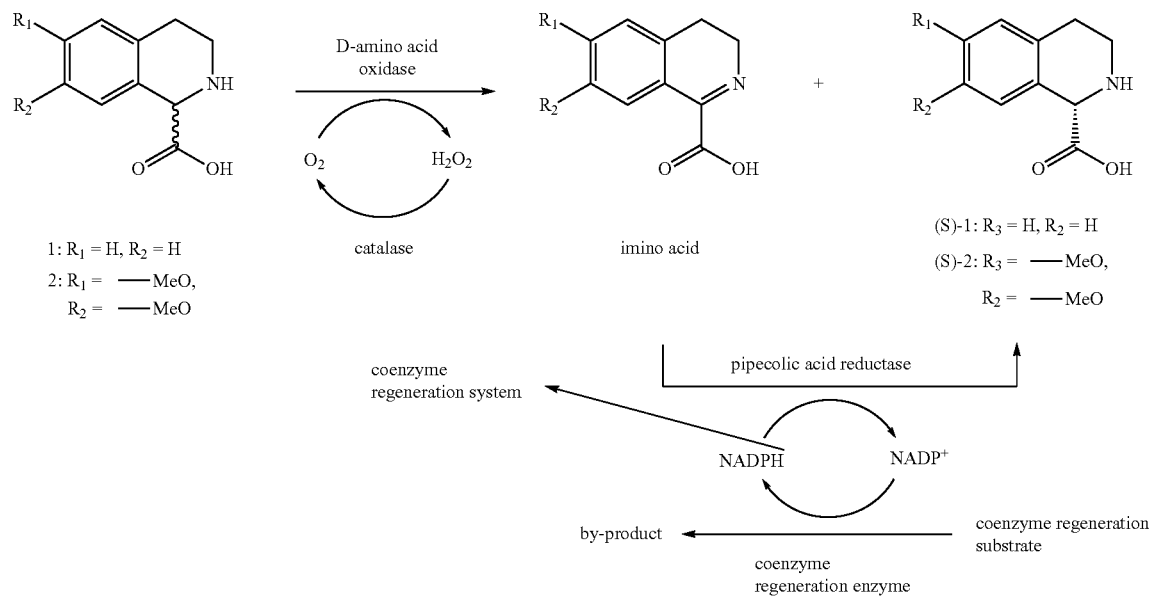

Further, the reaction to generate the imino acid is preferably carried out in the presence of flavin adenine dinucleotide (FAD), and during the reaction process, flavin adenine dinucleotide (FAD) is reduced to $FADH_2$, and then molecular oxygen is reduced to hydrogen peroxide ($H_2O_2$), and $FADH_2$ is oxidized to FAD. The hydrogen peroxide is catalytically decomposed into water and oxygen through catalase. The course of reaction is as follows:

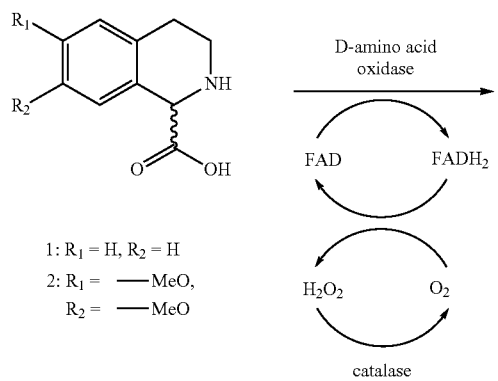

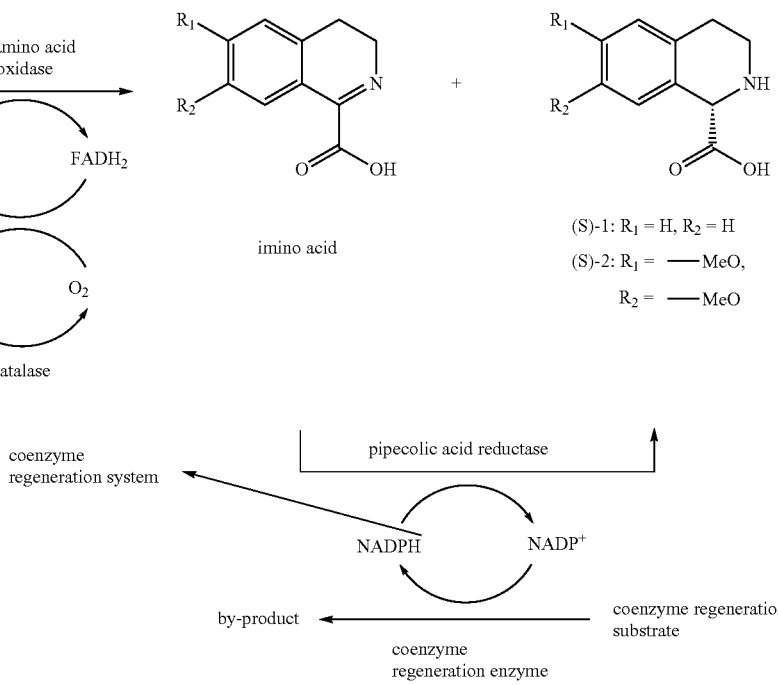

As preferred, the D-amino acid oxidase is derived from *Trigonopsis variabilis*, *Fusarium graminearum*, *Fusarium poae* or *Fusarium solani*. Specifically, the D-amino acid oxidase is derived from *Trigonopsis variabilis* CBS 4095, *Fusarium graminearum* CS3005, *Fusarium poae* 2516 or *Fusarium solani* M-0718.

As preferred, the pipecolic acid reductase is derived from *Pseudomonas putida*, *Pseudomonas aeruginosa*, *Pseudomonas fluorescens*, or *Pseudomonas entomophila* str. Specifically, the pipecolic acid reductase is derived from pipecolic acid reductase or its mutants from *Pseudomonas putida* KT2440, *Pseudomonas aeruginosa* PAO1, *Pseudomonas fluorescens* Pf0-1 or *Pseudomonas entomophila* str. L48 or other pipecolic acid reductase whose amino acid sequence homology is greater than 80% therewith.

As preferred, the coenzyme regeneration system comprises a coenzyme regeneration enzyme and a coenzyme regeneration substrate, and the coenzyme regeneration enzyme is derived from *Bacillus subtilis* or *Lactobscillus kefir*. Specifically, the coenzyme regeneration enzyme is glucose dehydrogenase derived from *Bacillus subtilis* 168, or, alcohol dehydrogenase derived from *Lactobscillus kefir* DSM20587.

Specifically, in the reaction system, the use form of the multienzyme system may be unorganized enzymes, crude enzymes, engineering bacteria resting cells expressing the recombinase, pure enzymes, or immobilized enzymes.

As preferred, the concentration of the initial substrate racemic 1,2,3,4-tetrahydroisoquinoline-1-carboxylic acid or racemic 6,7-dimethoxy-1,2,3,4-tetrahydroisoquinoline-1-carboxylic acid in the reaction system ranges from 1 to 20 g/L. More preferably, the concentration of the initial substrate in the reaction system is controlled to be 1 to 20 g/L. According to a specific aspect of the present disclosure, the concentration of the initial substrate in the reaction system is controlled to be 5 g/L.

As preferred, in the reaction system, the added amount of the D-amino acid oxidase is based on the wet weight of cells after centrifugation at 4000 rpm for 10 min, and the added amount of the cells is 1 to 5% of the weight of the reaction liquid.

As preferred, in the reaction system, the catalase is bovine liver catalase lyophilized powder with an enzyme activity of 4000 U/mg, and a ratio of enzyme activities of the catalase and the D-amino acid oxidase is (100 to 400): 1.

As preferred, in the reaction system, the added amount of the pipecolic acid reductase is based on the wet weight of cells after centrifugation at 4000 rpm for 10 min, and the added amount of the cells is 1 to 5% of the weight of the reaction liquid.

As preferred, in the reaction system, the added amount of the coenzyme regeneration enzyme is based on the wet weight of cells after centrifugation at 4000 rpm for 10 min, and the added amount of the cells is 1 to 5% of the weight of the reaction liquid.

As preferred, in the reaction system, oxidized form of nicotinamide adenine dinucleotide phosphate (NADP$^+$) may be added as the initial coenzyme, and the added amount of the coenzyme is 1‰ to 1%.

As preferred, in the reaction system, the reaction temperature is 20 to 70° C., the reaction time is 6 to 72 hours, the pH of the reaction liquid is 6 to 9; more preferably, the temperature is 30 to 40° C., and the reaction time is 12 to 48 hours. The pH of the reaction is controlled to be 7 to 8.5 through the phosphoric acid buffer.

In the following, the present disclosure is further explained combining with specific embodiments. It should be understood that the following embodiments are only for illustrating the present disclosure, rather than limiting the scope of the present disclosure.

The experimental methods in the embodiments of the present disclosure are conventional methods, unless otherwise specified.

The genes used in the embodiments of the present disclosure is synthesized by Sangon Biotech (Shanghai) Co., Ltd. *E. coli* BL21(DE3) strain was purchased from Novagen; DNA marker, PrimeStar DNA polymerase, low molecular weight standard protein and other molecular biology experiment reagents were purchased from TaKaRa. For specific operations of gene cloning and expression, please refer to "Molecular Cloning: A Laboratory Manual" edited by J. Sambrook et al.

Figure 1:
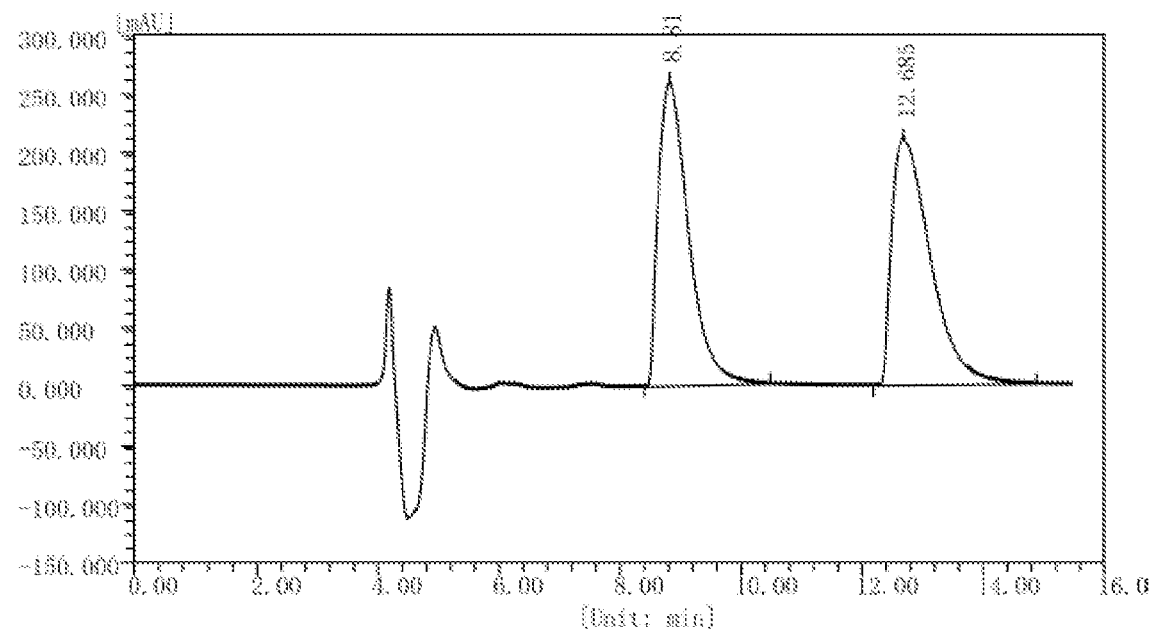
FIG. 1 shows a HPLC spectrum of two optical isomers of the substrate racemic 1,2,3,4-tetrahydroisoquinoline-1-carboxylic acid (1 g/L)

The present disclosure analyzed each product and substrate of the catalytic reaction through high performance liquid chromatography (HPLC). The HPLC analysis method of racemic 1,2,3,4-tetrahydroisoquinoline-1-carboxylic acid was: column/CHIRALPAK© ZWIX(−); column temperature/25° C.; flow rate/0.4 mL/min; detection wavelength/UV 220 nm; mobile phase: HPLC grade methanol (add 50 mM formic acid and 25 mM dihexylamine). See FIG. 1 for the specific peaks of related substances. The HPLC analysis method of racemic 6,7-dimethoxy-1,2,3,4-tetrahydroisoquinoline-1-carboxylic acid was: column/Chirobiotic TAG; column temperature/25° C.; flow rate/0.8 mL/min; detection wavelength/UV 220 nm and 232 nm; mobile phase: HPLC grade methanol/water (1:1) (Directed (R)- or (S)-Selective Dynamic Kinetic Enzymatic Hydrolysis of 1,2,3,4-Tetrahydroisoquinoline-1-carboxylic Esters [J]. *European Journal of Organic Chemistry*, 2008, 2008(31): 5269-76).

Embodiment 1: Construction of Genetically Engineered Strains 1.1 Screening of D-Amino Acid Oxidase and Construction of Genetically Engineered Bacteria Expressing D-Amino Acid Oxidase According to the specificity of the substrates, D-amino acid oxidase derived from microorganisms can be divided into two categories: 1) prefers amino acids with smaller side chain groups (such as D-alanine) as the substrate, such as D-amino acid oxidase derived from *Fusarium oxysporum*; 2) prefers amino acids with larger side chain groups (such as D-phenylalanine) as the substrate, such as D-amino acid oxidase derived from *Trigonopsis variabilis* (POLLEGIONI L, MOLLA G, SACCHI S, et al. Properties and applications of microbial D-amino acid oxidases: current state and perspectives [J]. Appl Microbiol Biotechnol, 2008, 78(1): 1-16). BLASTp analysis of the amino acid sequences of these two D-amino acid oxidases were carried out in the National Center for Biotechnology Information (NCBI) database (https://www.ncbi.nlm.nih.gov/), and 4 kinds of D-amino acid oxidases with different sequence identities were selected for further study (as shown in Table 1).

TABLE 1

D-amino acid oxidases derived from four different sources

| Serial NO. | Protein name | Source | NCBI accession number | Protein sequence |
|---|---|---|---|---|
| E₁ | FsDAAO | *Fusarium solani* M-0718 | BAA00692.1 | SEQ ID NO. 1 |
| E₂ | FgDAAO | *Fusarium graminearum* CS3005 | EYB24484.1 | SEQ ID NO. 2 |
| E₃ | FpDAAO | *Fusarium poae* 2516 | OBS19408.1 | SEQ ID NO. 3 |
| E₄ | TvDAAO | *Trigonopsis variabilis* CBS 4095 | CAA90322.1 | SEQ ID NO. 4 |

The above-mentioned D-amino acid oxidase gene sequences were codon-optimized and sent to Sangon Biotech (Shanghai) Co., Ltd. for gene synthesis, and cloned into the recombinant expression plasmid pET-28a(+). The recombinant plasmid was transferred into the expression host *E. coli* BL21(DE3), and after sequencing was verified to be correct, glycerol with an initial concentration of 25% was added to the obtained engineered bacteria liquid and stored at −80° C. for later use.

1.2 Construction of Genetically Engineered Bacteria Expressing Pipecolic Acid Reductase The pipecolic acid reductase genes were respectively cloned from *Pseudomonas putida* KT2440 genome, *Pseudomonas aeruginosa* PAO1 genome, *Pseudomonas fluorescens* Pf0-1 genome or *Pseudomonas entomophila* str. L48 genome (shown in Table 2).

TABLE 2

Pipecolic acid reductases derived from four different sources

| Serial NO. | Protein name | Source | NCBI accession number | Protein sequence |
|---|---|---|---|---|
| E₅ | PpdpkA | *Pseudomonas putida* KT2440 | SKC02707.1 | SEQ ID NO. 5 |
| E₆ | PadpkA | *Pseudomonas aeruginosa* PAO1 | NP_249943.1 | SEQ ID NO. 6 |
| E₇ | PfdpkA | *Pseudomonas fluorescens* Pf0-1 | ABA74308.1 | SEQ ID NO. 7 |
| E₈ | PedpkA | *Pseudomonas entomophila* str. L48 | CAK15457.1 | SEQ ID NO. 8 |

The PCR upstream primers and downstream primers were designed according to the corresponding gene DNA sequences.

The primers of pipecolic acid reductase derived from *Pseudomonas putida* KT2440 are:

```
KT2440-F:
5'-CGGGATCC ATGTCCGCACCTTCCACCAGCAC-3'  (BamH I)

KT2440-R:
5'-CCCAAGCTT TCAGCCAAGCAGCTCTTTCAGG-3'  (Hind III)
```

The primers of pipecolic acid reductase derived from *Pseudomonas aeruginosa* PAO1 are:

```
PAO1-F:
5'-CGGGATCCGTGATCCGAATGACGCTGGAC-3'  (BamH I)

PAO1-R:
5'-CCCAAGCTTTCACTCCAGCAACGCCAGC-3'  (Hind III)
```

The primers of pipecolic acid reductase derived from *Pseudomonas fluorescens* Pf0-1 are:

```
Pf0-1-F:
5'-CGGGATCCATGTCTGCGCCACACGATC-3'  (BamH I)

Pf0-1-R:
5'-CCGCTCGAGTTACTCGCCGGCCAGTTCAC-3'  (Xho I)
```

The primers of pipecolic acid reductase derived from *Pseudomonas entomophila* str. L48 are:

```
L48-F:
5'-CGGGATCCGTGCGCGTAGCCTTCAAC-3'  (BamH I)

L48-R:
5'-CCCAAGCTTTCACCTCGCCAGCGCCTTC-3'  (Hind III)
```

Restriction endonuclease cleavage sites were inserted to the upstream and downstream primers respectively, as indicated by the underline, and the specific restriction endonucleases are shown in parentheses of the primer sequences. The *Pseudomonas putida* KT2440 genome DNA, the *Pseudomonas aeruginosa* PAO1 genome DNA, the *Pseudomonas fluorescens* Pf0-1 genome DNA, and the *Pseudomonas entomophila* str. L48 genome DNA were used as templates, the corresponding upstream and downstream primers were utilized to perform PCR amplification reaction, and the PCR reaction system and the reaction conditions are as follows:

PCR Amplification System:

| DNA polymerase | 25 µL; |
| Upstream primer (10 pmol/µl) | 2.5 µL; |
| Downstream primer (10 pmol/µl) | 2.5 µL; |
| Template | 2.5 µL; |
| ddH$_2$O | 17.5 µL. |

PCR Amplification Conditions:
1) Initial denaturation at 95° C. for 5 min;
2) 30 cycles denaturation at 95° C. for 10 s, annealing at 58° C. for 15 s, and extension at 72° C. for 10 s;
3) Extension at 72° C. for 10 min;
4) Heat preservation at 4° C.

After the PCR amplification reaction was completed, 1.0% agarose gel electrophoresis was used to detect the amplification result, and the result showed that the amplified product was a single band of about 1000 bp. The target band was recovered with a DNA recovery and purification kit, and refer to the purification kit instructions for specific steps.

The expression vector pET-28a(+) and the PCR amplified product were double digested with corresponding restriction endonucleases. After the enzyme digestion was completed, the target band was recovered with a DNA recovery and purification kit. Subsequently, the double digested PCR amplification product was ligated to the expression vector pET-28a(+) with corresponding sticky ends by T4 DNA ligase, and the ligation system is shown in Table 3 below:

TABLE 3

Construction system of recombinant expression plasmid

| Reagent | Volume |
| --- | --- |
| PCR amplification product: | 10 µL |
| pET-28a(+) plasmid | 7 µL |
| T4 ligase | 1 µL |
| 10 × ligase Buffer | 2 µL |

The enzyme-ligated product was transformed into *E. coli* DH5a competent cells, plated, and a single colony was cultured in an LB liquid medium, the positive transformants were identified by PCR and sent to the sequencing company to verify the correctness of the inserted sequence. Plasmids were extracted from verified positive transformants, and refer to the plasmid extraction kit for related methods. The recombinant expression vector was transferred into the expression host *E. coli* BL21(DE3), and after PCR and sequencing of the bacteria liquid were verified to be correct, glycerol with an initial concentration of 25% was added to the obtained engineered bacteria liquid and stored at −80° C. for later use.

1.3 Construction of Genetically Engineered Bacteria Expressing Coenzyme Regeneration Enzyme.

The glucose dehydrogenase gene was cloned from *Bacillus subtilis* 168 genome (NCBI accession number: NP_388275.1, SEQ ID NO. 9); the alcohol dehydrogenase gene was cloned from *Lactobacillus kefiri* DSM20587 genome (NCBI accession number: AAP94029.1, SEQ ID NO. 10). The specific method and steps refer to the construction method of pipecolic acid reductase expression strain in Section 1.2. The corresponding upstream primers and downstream primers were as follows:

The primers of the glucose dehydrogenase derived from *Bacillus subtilis* 168 are:

BGdh-F:
5'-GAA<u>GATCT</u>GATGTATCCGGATTTAAAAGGAAAAGTC-3' (BglII)
BGdh-R:

5'-CAT<u>GCCATGG</u>TTAACCGCGGC-3' (Nco I)

The primers of the alcohol dehydrogenase derived from *Lactobacillus* kefiri DSM20587 are: IDC-35 DNA LAdh-F:
5'-CCGAATTCATGACCGATCGTCTGAAGGGC-3' (EcoR 1)

LAdh-R:
5'-CCCAAGCTTTCACTGTGCGGTATACCCGCC-3' (Hind III).

Embodiment 2

2.1 Cultivation of Micro-Organisms

The composition of liquid LB medium: peptone 10 g/L, yeast powder 5 g/L, and NaCl 10 g/L were dissolved in deionized water to volume, and sterilized at 121° C. for 20 min, for use. If it was a solid LB medium, 15 g/L agar was added.

The engineered bacteria containing the D-amino acid oxidase gene was inoculated into 5 mL liquid LB (containing 50 g/ml kanamycin) medium, and cultured with shaking at 200 rpm at 37° C. for about 8 hours. 1% (V/V) inoculation amount was inoculated in 100 mL liquid LB (containing 50 g/ml kanamycin) medium for culture, after OD$_{600}$ reached 0.6-0.8, an inducer isopropyl thiogalactoside (initial concentration was 0.1 mM) was added, and the system was induced at 18° C. for 15 h. After the culture was finished, the culture solution was poured into a 100 mL centrifuge tube and centrifuged at 4000 rpm for 10 min, the supernatant was discarded, and the bacterial cells was collected, washed twice with 50 mM phosphate buffer (pH 8.0), and stored at −80° C. in a ultra-low temperature refrigerator for later use.

2.2 Preparation of Crude Enzymes

The cells were resuspended in 25 mL phosphate buffer (50 mM, pH 8.0), subject to ultrasonication, and centrifuged to obtain the supernatant, which was crude enzyme containing D-amino acid oxidase or pipecolic acid reductase or coenzyme regeneration enzyme.

Embodiment 3: FsDAAO-PpdpkA Multienzyme Coupling to Prepare (S)-1,2,3,4-tetrahydroisoquinoline-1-Carboxylic Acid According to the method of Embodiment 2, crude D-amino acid oxidase derived from *Fusarium solani* M-0718, crude pipecolic acid reductase derived from *Pseudomonas putida* KT2440, and crude glucose dehydrogenase derived from *Bacillus subtilis* 168 were prepared, respectively.

0.2 g of racemic 1,2,3,4-tetrahydroisoquinoline-1-carboxylic acid hydrochloride was weighted and added to a 100 mL reaction bottle, 10 mL phosphate buffer (50 mM, pH=8.0) was added, and the solution was mixed evenly, and adjusted to pH 8.0 with 30% ammonia. 20 ml FsDAAO crude enzyme (the crude enzyme contained enough coenzyme FAD, therefore, there was no need to add additional FAD to the reaction system of the crude enzyme), 7.6 ml PpdpkA crude enzyme, 2.4 ml crude glucose dehydrogenase, 2 mg catalase, $NADP^+$ and D-glucose were added, to make the concentration of the racemic 1,2,3,4-tetrahydroisoquinoline-1-carboxylic acid be 5 g/L, the concentration of $NADP^+$ be 0.05 mM and the concentration of D-glucose be 15 mM in the initial reaction system. After mixing evenly, a sample was taken immediately as "0 hour". The reaction temperature was controlled by a water bath at 30° C., the system was magnetically stirred, the reaction pH was adjusted in the range from 8 to 8.5 with ammonia, and a sample was taken after 16 hours of reaction. The contents of the two configurations of 1,2,3,4-tetrahydroisoquinoline-1-carboxylic acid in the samples were tested by high performance liquid chromatography, that is, the concentrations (g/L) of the two configurations of 1,2,3,4-tetrahydroisoquinoline-1-carboxylic acid in the reaction liquid can be known.

The test results were shown in FIG. 2 and FIG. 3, FsDAAO exhibits strict R-configuration stereoselectivity, a yield of (S)-1,2,3,4-tetrahydroisoquinoline-1-carboxylic acid in the reaction liquid was 98.4% (yield=actual product concentration (g/L)/theoretical product concentration (g/L)× 100%), and ee value was 99.2%.

Embodiment 4: FpDAAO-PadpkA Multienzyme
Coupling to Prepare
(S)-1,2,3,4-tetrahydroisoquinoline-1-Carboxylic
Acid According to the method of Embodiment 2, crude D-amino acid oxidase derived from *Fusarium poae* 2516, crude pipecolic acid reductase derived from *Pseudomonas aeruginosa* PAO1, and crude alcohol dehydrogenase derived from *Lactobacillus* kefiri DSM20587 were prepared, respectively.

0.4 g of racemic 1,2,3,4-tetrahydroisoquinoline-1-carboxylic acid hydrochloride was weighted and added to a 100 mL reaction bottle, 10 mL phosphate buffer (50 mM, pH=8.0) was added, and the solution was mixed evenly, and adjusted to pH 8.0 with 30% ammonia. 20 ml FpDAAO crude enzyme, 8 ml PadpkA crude enzyme, 2.4 ml crude alcohol dehydrogenase, 2 mg catalase, $NADP^+$ and isopropanol were added, to make the concentration of the racemic 1,2,3,4-tetrahydroisoquinoline-1-carboxylic acid be 10 g/L, the concentration of $NADP^+$ be 0.1 mM and the concentration of isopropanol be 25 mM in the initial reaction system. After mixing evenly, a sample was taken immediately as "0 hour". The reaction temperature was controlled by a water bath at 30° C., the system was magnetically stirred, and a sample was taken after 30 hours of reaction. The contents of the two configurations of 1,2,3,4-tetrahydroisoquinoline-1-carboxylic acid in the samples were tested by high performance liquid chromatography, that is, the concentrations (g/L) of the two configurations of 1,2,3,4-tetrahydroisoquinoline-1-carboxylic acid in the reaction liquid can be known. The yield of (S)-1,2,3,4-tetrahydroisoquinoline-1-carboxylic acid in the reaction liquid was 95.2% (the calculation method was the same as Embodiment 3), and ee value was 99.4%.

Embodiment 5: FgDAAO-PfdpkA Multienzyme
Coupling to Prepare
(S)-1,2,3,4-tetrahydroisoquinoline-1-Carboxylic
Acid According to the method of Embodiment 2, crude D-amino acid oxidase derived from *Fusarium graminearum* CS3005, crude pipecolic acid reductase derived from *Pseudomonas fluorescens* Pf0-1, and crude glucose dehydrogenase derived from *Bacillus subtilis* 168 were prepared, respectively.

0.04 g of racemic 1,2,3,4-tetrahydroisoquinoline-1-carboxylic acid hydrochloride was weighted and added to a 100 mL reaction bottle, 10 mL phosphate buffer (50 mM, pH=8.0) was added, and the solution was mixed evenly, and adjusted to pH 8.0 with 30% ammonia. 20 ml FgDAAO crude enzyme, 7.5 ml PfdpkA crude enzyme, 2.5 ml crude glucose dehydrogenase, 2 mg catalase, $NADP^+$ and D-glucose were added, to make the concentration of the racemic 1,2,3,4-tetrahydroisoquinoline-1-carboxylic acid in the initial reaction system be 1 g/L, the concentration of $NADP^+$ be 0.01 mM and the concentration of D-glucose be 3 mM. After mixing evenly, a sample was taken immediately as "0 hour". The reaction temperature was controlled by a water bath at 30° C., the system was magnetically stirred, the reaction pH was adjusted in the range from 8 to 8.5 with ammonia, and a sample was taken after 6 hours of reaction. The contents of the two configurations of 1,2,3,4-tetrahydroisoquinoline-1-carboxylic acid in the samples were tested by high performance liquid chromatography, that is, the concentrations (g/L) of the two configurations of 1,2,3,4-tetrahydroisoquinoline-1-carboxylic acid in the reaction liquid can be known. The yield of (S)-1,2,3,4-tetrahydroisoquinoline-1-carboxylic acid in the reaction liquid was 99.4% (the calculation method was the same as Embodiment 3), and ee value was 99.1%.

Embodiment 6: TvDAAO-PedpkA Multienzyme
Coupling to Prepare
(S)-1,2,3,4-tetrahydroisoquinoline-1-Carboxylic
Acid According to the method of Embodiment 2, crude D-amino acid oxidase derived from *Trigonopsis variabilis* CBS 4095, crude pipecolic acid reductase derived from *Pseudomonas entomophila* str. L48, and crude alcohol dehydrogenase derived from *Lactobacillus* kefiri DSM20587 were prepared, respectively.

0.8 g of racemic 1,2,3,4-tetrahydroisoquinoline-1-carboxylic acid hydrochloride was weighted and added to a 100 mL reaction bottle, 10 mL phosphate buffer (50 mM, pH=8.0) was added, and the solution was mixed evenly, and adjusted to pH 8.0 with 30% ammonia. 20 ml TvDAAO crude enzyme, 8 ml PedpkA crude enzyme, 2.4 ml crude alcohol dehydrogenase, 2 mg catalase, $NADP^+$ and isopropanol were added, to make the concentration of the racemic 1,2,3,4-tetrahydroisoquinoline-1-carboxylic acid be 20 g/L, the concentration of $NADP^+$ be 0.1 mM and the concentration of isopropanol be 50 mM in the initial reaction system. After mixing evenly, a sample was taken immediately as "0 hour". The reaction temperature was controlled by a water bath at 30° C., the system was magnetically stirred, and a sample was taken after 50 hours of reaction. The contents of the two configurations of 1,2,3,4-tetrahydroisoquinoline-1-carboxylic acid in the samples were tested by high performance liquid chromatography, that is, the concentrations (g/L) of the two configurations of 1,2,3,4-tetrahydroisoqui-noline-1-carboxylic acid in the reaction liquid can be known. The yield of (S)-1,2,3,4-tetrahydroisoquinoline-1-carboxylic acid in the reaction liquid was 92.5% (the calculation method was the same as Embodiment 3), and ee value was 99.2%.

Embodiment 7: FsDAAO-PpdpkA Multienzyme Coupling to Prepare (S)-6,7-dimethoxy-1,2,3,4-tetrahydroisoquinoline-1-Carboxylic Acid According to the method of Embodiment 2, crude D-amino acid oxidase derived from *Fusarium solani* M-0718, crude pipecolic acid reductase derived from *Pseudomonas putida* KT2440, and crude glucose dehydrogenase derived from *Bacillus subtilis* 168 were prepared, respectively.

0.2 g of racemic 6,7-dimethoxy-1,2,3,4-tetrahydroisoquinoline-1-carboxylic acid was weighted and added to a 100 mL reaction bottle, 10 mL phosphate buffer (50 mM, pH=8.0) was added, and the solution was mixed evenly, and adjusted to pH 8.0 with 30% ammonia. 20 ml FsDAAO crude enzyme, 7.6 ml PpdpkA crude enzyme, 2.4 ml crude glucose dehydrogenase, 2 mg catalase, NADP$^+$ and D-glucose were added, to make the concentration of the racemic 6,7-dimethoxy-1,2,3,4-tetrahydroisoquinoline-1-carboxylic acid be 5 g/L, the concentration of NADP$^+$ be 0.05 mM and the concentration of D-glucose be 15 mM in the initial reaction system. After mixing evenly, a sample was taken immediately as "0 hour". The reaction temperature was controlled by a water bath at 30° C., the system was magnetically stirred, the reaction pH was adjusted in the range from 8 to 8.5 with ammonia, and a sample was taken after 19 hours of reaction. The contents of the two configurations of 6,7-dimethoxy-1,2,3,4-tetrahydroisoquinoline-1-carboxylic acid in the samples were tested by high performance liquid chromatography, that is, the concentrations (g/L) of the two configurations of 6,7-dimethoxy-1,2,3,4-tetrahydroisoquinoline-1-carboxylic acid in the reaction liquid can be known. The yield of (S)-6,7-dimethoxy-1,2,3,4-tetrahydroisoquinoline-1-carboxylic acid in the reaction liquid was 97.4% (the calculation method was the same as Embodiment 3), and ee value was 99.1%.

Embodiment 8: FpDAAO-PfdpkA Multienzyme Coupling to Prepare (S)-6,7-dimethoxy-1,2,3,4-tetrahydroisoquinoline-1-Carboxylic Acid According to the method of Embodiment 2, crude D-amino acid oxidase derived from *Fusarium poae* 2516, crude pipecolic acid reductase derived from *Pseudomonas fluorescens* Pf0-1, and crude alcohol dehydrogenase derived from *Lactobacillus kefiri* DSM20587 were prepared, respectively.

0.16 g of racemic 6,7-dimethoxy-1,2,3,4-tetrahydroisoquinoline-1-carboxylic acid was weighted and added to a 100 mL reaction bottle, 10 mL phosphate buffer (50 mM, pH=8.0) was added, and the solution was mixed evenly, and adjusted to pH 8.0 with 30% ammonia. 20 ml FpDAAO crude enzyme, 8 ml PfdpkA crude enzyme, 2 ml crude alcohol dehydrogenase, 2 mg catalase, NADP$^+$ and isopropanol were added, to make the concentration of the racemic 6,7-dimethoxy-1,2,3,4-tetrahydroisoquinoline-1-carboxylic acid be 4 g/L, the concentration of NADP$^+$ be 0.01 mM and the concentration of isopropanol be 10 mM in the initial reaction system. After mixing evenly, a sample was taken immediately as "0 hour". The reaction temperature was controlled by a water bath at 30° C., the system was magnetically stirred, and a sample was taken after 20 hours of reaction. The contents of the two configurations of 6,7-dimethoxy-1,2,3,4-tetrahydroisoquinoline-1-carboxylic acid in the samples were tested by high performance liquid chromatography, that is, the concentrations (g/L) of the two configurations of 6,7-dimethoxy-1,2,3,4-tetrahydroisoquinoline-1-carboxylic acid in the reaction liquid can be known. The yield of (S)-6,7-dimethoxy-1,2,3,4-tetrahydroisoquinoline-1-carboxylic acid was 94.8% (the calculation method was the same as Embodiment 3), and ee value was 99.2%.

Embodiment 9: FgDAAO-PadpkA Multienzyme Coupling to Prepare (S)-6,7-dimethoxy-1,2,3,4-tetrahydroisoquinoline-1-Carboxylic Acid According to the method of Embodiment 2, crude D-amino acid oxidase derived from *Fusarium graminearum* CS3005, crude pipecolic acid reductase derived from *Pseudomonas aeruginosa* PAO1, and crude glucose dehydrogenase derived from *Bacillus subtilis* 168 were prepared, respectively.

0.1 g of racemic 6,7-dimethoxy-1,2,3,4-tetrahydroisoquinoline-1-carboxylic acid was weighted and added to a 100 mL reaction bottle, 10 mL phosphate buffer (50 mM, pH=8.0) was added, and the solution was mixed evenly, and adjusted to pH 8.0 with 30% ammonia. 20 ml FgDAAO crude enzyme, 8 ml PadpkA crude enzyme, 2 ml crude glucose dehydrogenase, 2 mg catalase, NADP$^+$ and D-glucose were added, to make the concentration of the racemic 6,7-dimethoxy-1,2,3,4-tetrahydroisoquinoline-1-carboxylic acid be 2.5 g/L, the concentration of NADP$^+$ be 0.01 mM and the concentration of D-glucose be 5 mM in the initial reaction system. After mixing evenly, a sample was taken immediately as "0 hour". The reaction temperature was controlled by a water bath at 30° C., the system was magnetically stirred, the reaction pH was adjusted in the range from 8 to 8.5 with ammonia, and a sample was taken after 20 hours of reaction. The contents of the two configurations of 6,7-dimethoxy-1,2,3,4-tetrahydroisoquinoline-1-carboxylic acid in the samples were tested by high performance liquid chromatography, that is, the concentrations (g/L) of the two configurations of 6,7-dimethoxy-1,2,3,4-tetrahydroisoquinoline-1-carboxylic acid in the reaction liquid can be known. The yield of (S)-6,7-dimethoxy-1,2,3,4-tetrahydroisoquinoline-1-carboxylic acid was 96.5% (the calculation method was the same as Embodiment 3), and ee value was 99.2%.

Embodiment 10: TvDAAO-PedpkA Multienzyme Coupling to Prepare (S)-6,7-dimethoxy-1,2,3,4-tetrahydroisoquinoline-1-Carboxylic Acid According to the method of Embodiment 2, crude D-amino acid oxidase derived from *Trigonopsis variabilis* CBS 4095, crude pipecolic acid reductase derived from *Pseudomonas entomophila* str. L48, and crude alcohol dehydrogenase derived from *Lactobacillus kefiri* DSM20587 were prepared, respectively.

0.5 g of racemic 6,7-dimethoxy-1,2,3,4-tetrahydroisoquinoline-1-carboxylic acid was weighted and added to a 100 mL reaction bottle, 10 mL phosphate buffer (50 mM, pH=8.0) was added, and the solution was mixed evenly, and adjusted to pH 8.0 with 30% ammonia. 20 ml TvDAAO crude enzyme, 8 ml PedpkA crude enzyme, 2 ml crude alcohol dehydrogenase, 2 mg catalase, NADP$^+$ and isopropanol were added, to make the concentration of the racemic 6,7-dimethoxy-1,2,3,4-tetrahydroisoquinoline-1-carboxylic acid be 12.5 g/L, the concentration of NADP$^+$ be 0.02 mM and the concentration of isopropanol be 25 mM in the initial reaction system. After mixing evenly, a sample was taken immediately as "0 hour". The reaction temperature was controlled by a water bath at 30° C., the system was magnetically stirred, and a sample was taken after 24 hours of reaction. The contents of the two configurations of 6,7-dimethoxy-1,2,3,4-tetrahydroisoquinoline-1-carboxylic acid in the samples were tested by high performance liquid chromatography, that is, the concentrations (g/L) of the two configurations of 6,7-dimethoxy-1,2,3,4-tetrahydroisoquinoline-1-carboxylic acid in the reaction liquid can be known. The yield of (S)-6,7-dimethoxy-1,2,3,4-tetrahydroisoquinoline-1-carboxylic acid was 92.4% (the calculation method was the same as Embodiment 3), and ee value was 99.5%.

Embodiment 11: Pure FsDAAO-PpdpkA Multienzyme Coupling to Prepare (S)-1,2,3,4-tetrahydroisoquinoline-1-Carboxylic Acid Preparation of substrate solution: 50 mM phosphate buffer solution (pH=8.0) was used to prepare 10 g/L of racemic 1,2,3,4-tetrahydroisoquinoline-1-carboxylic acid solution, which was adjusted to pH 8.0 with 30% ammonia.

1 ml substrate solution was added to a 5 mL reaction tube, then pure FsDAAO, sodium flavin adenine dinucleotide, catalase, pure PpdpkA, NADP$^+$, pure glucose dehydrogenase, and D-glucose were added, and a phosphate buffer (50 mM, pH=8.0) was added to a total volume of 2 ml, to make the concentration of the substrate racemic 1,2,3,4-tetrahydroisoquinoline-1-carboxylic acid be 5 g/L, the initial concentration of the pure FsDAAO be 0.74 mg/ml, the initial concentration of FAD be 100 µM, the initial concentration of the pure PpdpkA be 2.4 mg/ml, the initial concentration of the pure glucose dehydrogenase be 0.1 mg/ml, the initial concentration of the NADP$^+$ be 0.01 mM, the initial concentration of the catalase be 0.01 mg/ml, and the initial concentration of D-glucose be 15 mM in the initial reaction system. After mixing evenly, a sample was taken immediately as "0 hour". The reaction tube was placed at a 30° C. thermostatic water bath, and the system was magnetically stirred and reacted for 2 hours. After the reaction was completed, the contents of the two configurations of 1,2,3,4-tetrahydroisoquinoline-1-carboxylic acid in the samples were tested by high performance liquid chromatography, that is, the concentrations (g/L) of the two configurations of 1,2,3,4-tetrahydroisoquinoline-1-carboxylic acid in the reaction liquid can be known. The yield of (S)-1,2,3,4-tetrahydroisoquinoline-1-carboxylic acid was 99.2% (the calculation method was the same as Embodiment 3), and ee value was 99.5%.

Embodiment 12: Pure FsDAAO-PpdpkA Multienzyme Coupling to Prepare (S)-6,7-dimethoxy-1,2,3,4-tetrahydroisoquinoline-1-Carboxylic Acid Preparation of substrate solution: 50 mM phosphate buffer solution (pH=8.0) was used to prepare 10 g/L of racemic 6,7-dimethoxy-1,2,3,4-tetrahydroisoquinoline-1-carboxylic acid solution, which was adjusted to pH 8.0 with 30% ammonia.

1 ml substrate solution was added to a 5 mL reaction tube, then pure FsDAAO, sodium flavin adenine dinucleotide, catalase, pure PpdpkA, NADP$^+$, pure glucose dehydrogenase, and D-glucose were added, and a phosphate buffer (50 mM, pH=8.0) was added to the system to a total volume of 2 ml, to make the concentration of the substrate racemic 6,7-dimethoxy-1,2,3,4-tetrahydroisoquinoline-1-carboxylic acid be 4 g/L, the initial concentration of the pure FsDAAO be 0.74 mg/ml, the initial concentration of FAD be 100 µM, the initial concentration of the pure PpdpkA be 2.4 mg/ml, the initial concentration of the pure glucose dehydrogenase be 0.1 mg/ml, the initial concentration of the NADP$^+$ be 0.01 mM, the initial concentration of the catalase be 0.01 mg/ml, and the initial concentration of D-glucose be 8 mM in the initial reaction system. After mixing evenly, a sample was taken immediately as "0 hour". The reaction tube was placed at a 30° C. thermostatic water bath, and the system was magnetically stirred and reacted for 3 hours. After the reaction was completed, the contents of the two configurations of 6,7-dimethoxy-1,2,3,4-tetrahydroisoquinoline-1-carboxylic acid in the samples were tested by high performance liquid chromatography, that is, the concentrations (g/L) of the two configurations of 6,7-dimethoxy-1,2,3,4-tetrahydroisoquinoline-1-carboxylic acid in the reaction liquid can be known. The yield of (S)-6,7-dimethoxy-1,2,3,4-tetrahydroisoquinoline-1-carboxylic acid was 99.1% (the calculation method was the same as Embodiment 3), and ee value was 99.4%.

Embodiment 13: FsDAAO-PpdpkA Multienzyme Coupling to Prepare (S)-1,2,3,4-tetrahydroisoquinoline-1-Carboxylic Acid According to the method of Embodiment 2, crude D-amino acid oxidase derived from *Fusarium solani* M-0718, crude pipecolic acid reductase derived from *Pseudomonas putida* KT2440, and crude glucose dehydrogenase derived from *Bacillus subtilis* 168 were prepared, respectively.

0.2 g of racemic 1,2,3,4-tetrahydroisoquinoline-1-carboxylic acid hydrochloride was weighted and added to a 100 mL reaction bottle, 10 mL phosphate buffer (50 mM, pH=8.0) was added, and the solution was mixed evenly, and adjusted to pH 8.0 with 5 M sodium hydroxide solution. 20 ml FgDAAO crude enzyme, 7.6 ml PpdpkA crude enzyme, 2.4 ml crude glucose dehydrogenase, 2 mg catalase, NADP$^+$ and D-glucose were added, to make the initial concentration of the racemic 1,2,3,4-tetrahydroisoquinoline-1-carboxylic acid be 5 g/L, the initial concentration of NADP$^+$ be 0.01 mM, and the initial concentration of D-glucose be 15 mM. After mixing evenly, a sample was taken immediately as "0 hour". The reaction temperature was controlled by a water bath at 30° C., the system was magnetically stirred, the reaction pH was adjusted in the range from 8 to 8.5 with 0.5 M sodium hydroxide solution, and a sample was taken after 16 hours of reaction. The contents of the two configurations of 1,2,3,4-tetrahydroisoquinoline-1-carboxylic acid in the samples were tested by high performance liquid chromatography, that is, the concentrations (g/L) of the two configurations of 1,2,3,4-tetrahydroisoquinoline-1-carboxylic acid in the reaction liquid can be known. The yield of (S)-1,2,3,4-tetrahydroisoquinoline-1-carboxylic acid in the reaction liquid was 99.1% (the calculation method was the same as Embodiment 3), and ee value was 99.4%.

Embodiment 14: FsDAAO-PpdpkA Multienzyme Coupling to Prepare (S)-6,7-dimethoxy-1,2,3,4-tetrahydroisoquinoline-1-Carboxylic Acid According to the method of Embodiment 2, crude D-amino acid oxidase derived from *Fusarium solani* M-0718, crude pipecolic acid reductase derived from *Pseudomonas putida* KT2440, and crude glucose dehydrogenase derived from *Bacillus subtilis* 168 were prepared, respectively.

0.2 g of racemic 6,7-dimethoxy-1,2,3,4-tetrahydroisoquinoline-1-carboxylic acid was weighted and added to a 100 mL reaction bottle, 10 mL phosphate buffer (50 mM, pH=8.0) was added, and the solution was mixed evenly, and adjusted to pH 8.0 with 5 M sodium hydroxide solution. 20 ml FgDAAO crude enzyme, 7.6 ml PpdpkA crude enzyme, 2.4 ml crude glucose dehydrogenase, 2 mg catalase, $NADP^+$ and D-glucose were added, to make the initial concentration of the racemic 6,7-dimethoxy-1,2,3,4-tetrahydroisoquinoline-1-carboxylic acid be 5 g/L, the initial concentration of $NADP^+$ be 0.01 mM, and the initial concentration of D-glucose be 15 mM. After mixing evenly, a sample was taken immediately as "0 hour". The reaction temperature was controlled by a water bath at 30° C., the system was magnetically stirred, the reaction pH was adjusted in the range from 8 to 8.5 with 0.5 M sodium hydroxide solution, and a sample was taken after 18 hours of reaction. The contents of the two configurations of 6,7-dimethoxy-1,2,3,4-tetrahydroisoquinoline-1-carboxylic acid in the samples were tested by high performance liquid chromatography, that is, the concentrations (g/L) of the two configurations of 6,7-dimethoxy-1,2,3,4-tetrahydroisoquinoline-1-carboxylic acid in the reaction liquid can be known. The yield of (S)-6,7-dimethoxy-1,2,3,4-tetrahydroisoquinoline-1-carboxylic acid was 98.6% (the calculation method was the same as Embodiment 3), and ee value was 99.1%.

Embodiment 15: Preparation and Separation of (S)-1,2,3,4-tetrahydroisoquinoline-1-Carboxylic Acid The substrate solution and the reaction system were as in Embodiment 3.

After the reaction was completed, pH of the reaction system was adjusted to 5.0-6.0. The system was placed at a 99° C. water bath to precipitate degenerated proteins, and vacuum filtered. The filtrate was rotary evaporated at 65° C. to concentrate the reaction volume by 10 times. The system was placed on ice, cooled, and vacuum filtered. The precipitated white crystals are carefully scraped off, placed in an oven, dried and weighed. 0.2 g of white dried crystals was weighed, dissolved in 50 mM phosphate buffer solution (pH=8.0) to a volume of 50 ml, and sampled. The contents of the two configurations of 1,2,3,4-tetrahydroisoquinoline-1-carboxylic acid in the sample was tested by high performance liquid chromatography, that is, the contents (g/L) of the two configurations of 1,2,3,4-tetrahydroisoquinoline-1-carboxylic acid in the separated product can be known. The yield of (S)-1,2,3,4-tetrahydroisoquinoline-1-carboxylic acid was 80.2%, and ee value was 99.8%.

Embodiment 16: Preparation and Separation of (S)-6,7-dimethoxy-1,2,3,4-tetrahydroisoquinoline-1-carboxylic acid The substrate solution and the reaction system were as in Embodiment 7.

After the reaction was completed, pH of the reaction system was adjusted to 5.0-6.0. The system was placed at a 99° C. water bath to precipitate degenerated proteins, and vacuum filtered. The filtrate was rotary evaporated at 65° C. to concentrate the reaction volume by 10 times. The system was placed on ice, cooled, and vacuum filtered. The precipitated white crystals are carefully scraped off, placed in an oven, dried and weighed. 0.25 g of white dried crystals was weighed, dissolved in 50 mM phosphate buffer solution (pH=8.0) to a volume of 50 ml, and sampled. The contents of the two configurations of 6,7-dimethoxy-1,2,3,4-tetrahydroisoquinoline-1-carboxylic acid in the sample was tested by high performance liquid chromatography, that is, the contents (g/L) of the two configurations of 6,7-dimethoxy-1,2,3,4-tetrahydroisoquinoline-1-carboxylic acid in the separated product can be known. The yield of (S)-6,7-dimethoxy-1,2,3,4-tetrahydroisoquinoline-1-carboxylic acid was 78.5%, and ee value was 99.8%.

Control 1: Preparation of (S)-1,2,3,4-tetrahydroisoquinoline-1-carboxylic Acid by FsDAAO Preparation of substrate solution: 50 mM phosphate buffer solution (pH=8.0) was used to prepare 10 g/L of racemic 1,2,3,4-tetrahydroisoquinoline-1-carboxylic acid solution, which was adjusted to pH 8.0 with 30% ammonia.

1 ml of substrate solution was added to a 5 ml reaction tube, and then 1 ml FsDAAO crude enzyme (the crude enzyme contained enough coenzyme FAD, therefore, there was no need to add additional FAD to the reaction system of the crude enzyme) was added. After mixing evenly, a sample was taken immediately as "0 hour" and analyzed through HPLC. The reaction tube was placed at a 30° C. thermostatic water bath, and the system was magnetically stirred and reacted for 30 hours. After the reaction was completed, the contents of the two configurations of 1,2,3,4-tetrahydroisoquinoline-1-carboxylic acid in the samples were tested through HPLC, that is, the concentrations (g/L) of the two configurations of 1,2,3,4-tetrahydroisoquinoline-1-carboxylic acid in the reaction system can be known.

FsDAAO exhibited strict R-configuration stereoselectivity, and the yield was 49.9%, and ee value of (S)-1,2,3,4-tetrahydroisoquinoline-1-carboxylic acid was above 99%.

Control 2: Preparation of (S)-1,2,3,4-tetrahydroisoquinoline-1-carboxylic acid by $FsDAAO-NaCNBH_3$ Preparation of substrate solution: 50 mM phosphate buffer solution (pH=8.0) was used to prepare 10 g/L of racemic 1,2,3,4-tetrahydroisoquinoline-1-carboxylic acid solution, which was adjusted to pH 8.0 with 30% ammonia.

20 ml of substrate solution was added to a 100 ml reactor, and then 20 ml FsDAAO crude enzyme (the crude enzyme contained enough coenzyme FAD, therefore, there was no need to add additional FAD to the reaction system of the crude enzyme), 8 mg catalase lyophilized powder, and 0.3 g $NaCNBH_3$ were added. After mixing evenly, a sample was taken immediately as "0 hour". The reaction system was placed at a 30° C. thermostatic water bath, magnetically stirred, reacted for 30 hours, and sampled. The contents of the two configurations of 1,2,3,4-tetrahydroisoquinoline-1-carboxylic acid in the samples were tested by high performance liquid chromatography, that is, the concentrations (g/L) of the two configurations of 1,2,3,4-tetrahydroisoquinoline-1-carboxylic acid in the reaction liquid can be known. FsDAAO exhibited strict R-configuration stereoselectivity, and the yield of (S)-1,2,3,4-tetrahydroisoquinoline-1-carboxylic acid was 78.8%, and ee value was above 99.2%.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A method for preparing an S-isomer of a compound represented by Formula (I),

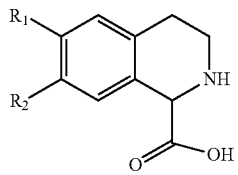

wherein:
in Formula (I), $R_1$ and $R_2$ are independently selected from the group consisting of (i) hydrogen, (ii) $C_1$-$C_6$ alkyl, and (iii) $C_1$-$C_6$ alkoxy, and
the method comprises the steps of:
taking a racemate mixture of a compound represented by Formula (I) or salts thereof as a mixture, and
making a R-isomer of the compound represented by Formula (I) in the substrate react under the catalysis of an oxidative dehydrogenase to generate an imino acid represented by Formula (II);

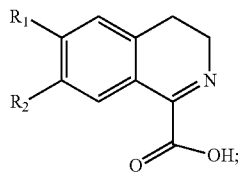

wherein the oxidative dehydrogenase is a D-amino acid oxidase which has an amino acid sequence as shown in SEQ ID NO. 1, SEQ ID NO. 2, SEQ ID NO. 3, or SEQ ID NO. 4;
and
converting the imino acid represented by Formula (II) into an S-isomer of the compound represented by the Formula (I) in the presence of a pipecolic acid reductase and a coenzyme capable of supplying hydrogen anions;
and wherein:
the pipecolic acid reductase has an amino acid sequence as shown in SEQ ID NO. 5, SEQ ID NO. 6, SEQ ID NO. 7, or SEQ ID NO. 8; and
the coenzyme capable of supplying hydrogen anions is NADH, NADPH, or a combination thereof.

2. The method of claim 1, wherein:
in the Formula (I), $R_1$ and $R_2$ are independently selected from the group consisting of hydrogen, methyl, ethyl, isopropyl, methoxy, or ethoxy; and
the salt is an ammonium salt.

3. The method according to claim 1, wherein an S-isomer of the compound represented by Formula (I) is (S)-1,2,3,4-tetrahydroisoquinoline-1-carboxylic acid or (S)-6,7-dimethoxy-1,2,3,4-tetrahydroisoquinoline-1-carboxylic acid.

4. The method according to claim 1, wherein the use form of the D-amino acid oxidase is unorganized D-amino acid oxidase, crude enzyme containing unorganized D-amino acid oxidase, pure D-amino acid oxidase, immobilized D-amino acid oxidase, or cells intracellularly expressing D-amino acid oxidase.

5. The method according to claim 4, wherein:
the cell is an engineering bacteria expressing D-amino acid oxidase and containing an expression vector pET-28a(+), and
a host cell of the engineering bacteria is E. coli BL21 (DE3);
and wherein, the D-amino acid oxidase gene is connected to the expression vector pET-28a(+).

6. The method according to claim 5, wherein the use form of the pipecolic acid reductase is an unorganized pipecolic acid reductase, a crude enzyme containing unorganized pipecolic acid reductase, a pure pipecolic acid reductase, an immobilized pipecolic acid reductase, or cells intracellularly expressing pipecolic acid reductase.

7. The method according to claim 6, wherein:
the cell is an engineering bacteria expressing pipecolic acid reductase and containing an expression vector pET-28a(+), and
a host cell of the engineering bacteria is E. coli BL21 (DE3);
and wherein the pipecolic acid reductase is connected to the expression vector pET-28a(+).

8. The method according to claim 1, wherein:
(i) the reaction to generate imino acid is also carried out in the presence of the coenzyme flavin adenine dinucleotide (FAD), (ii) the reaction to generate imino acid is also carried out in the presence of the enzyme catalase, (iii) the reaction to generate imino acid is also carried out at a setting temperature and in the presence of oxygen, wherein the setting temperature is from 20° C. to 70° C., inclusive, or (iv) combinations thereof.

9. The method according to claim 1, wherein the implementation process of the method comprises:
first building a reaction system,
then, controlling the reaction system to react at a setting temperature in an aerobic environment, in which the reaction system comprises the substrate, the oxidative dehydrogenation, the pipecolic acid reductase, the coenzyme, a coenzyme regeneration system and water,
and wherein:
the reaction system selectively comprises a pH buffer and/or pH regulator,
the coenzyme comprises $NAD^+$ and/or NADH, or, the coenzyme comprises $NADP^+$ and/or NADPH.

10. The method according to claim 9, wherein (i) the coenzyme regeneration system comprises a coenzyme regeneration enzyme and a coenzyme regeneration substrate, (ii) the reaction system further comprises the enzyme catalase, (iii) the reaction system further comprises flavin adenine dinucleotide, or (iv) combinations thereof.

11. The method according to claim 10, wherein the coenzyme regeneration enzyme is glucose dehydrogenase, and the coenzyme regeneration substrate is glucose; or the coenzyme regeneration enzyme is alcohol dehydrogenase, and the coenzyme regeneration substrate is isopropanol.

12. The method according to claim 11, wherein the glucose dehydrogenase is derived from *Bacillus subtilis* 168; and/or, the alcohol dehydrogenase is derived from *Lactobscillus kefir* DSM20587.

13. The method according to claim 10, wherein the catalase is bovine liver catalase lyophilized powder.

14. The method according to claim 10, wherein a ratio of enzyme activities of the catalase and the oxidative dehydrogenase is (100 to 400):1.

* * * * *

SEQUENCE LISTING

<160> NUMBER OF SEQ ID NOS: 10

<210> SEQ ID NO 1
<211> LENGTH: 361
<212> TYPE: PRT
<213> ORGANISM: Homo sapiens

<400> SEQUENCE: 1

Met Ser Asn Thr Ile Val Val Gly Ala Gly Val Ile Gly Leu Thr
1               5                   10                  15

Ser Ala Leu Leu Leu Ser Lys Asn Lys Gly Asn Lys Ile Thr Val Val
            20                  25                  30

Ala Lys His Met Pro Gly Asp Tyr Asp Val Glu Tyr Ala Ser Pro Phe
            35                  40                  45

Ala Gly Ala Asn His Ser Pro Met Ala Thr Glu Glu Ser Ser Glu Trp
            50                  55                  60

Glu Arg Arg Thr Trp Tyr Glu Phe Lys Arg Leu Val Glu Glu Val Pro
65                  70                  75                  80

Glu Ala Gly Val His Phe Gln Lys Ser Arg Ile Gln Arg Arg Asn Val
                    85                  90                  95

Asp Thr Glu Lys Ala Gln Arg Ser Gly Phe Pro Asp Ala Leu Phe Ser
            100                 105                 110

Lys Glu Pro Trp Phe Lys Asn Met Phe Glu Asp Phe Arg Glu Gln His
            115                 120                 125

Pro Ser Glu Val Ile Pro Gly Tyr Asp Ser Gly Cys Glu Phe Thr Ser
            130                 135                 140

Val Cys Ile Asn Thr Ala Ile Tyr Leu Pro Trp Leu Leu Gly Gln Cys
145                 150                 155                 160

Ile Lys Asn Gly Val Ile Val Lys Arg Ala Ile Leu Asn Asp Ile Ser
                    165                 170                 175

Glu Ala Lys Lys Leu Ser His Ala Gly Lys Thr Pro Asn Ile Ile Val
            180                 185                 190

Asn Ala Thr Gly Leu Gly Ser Tyr Lys Leu Gly Gly Val Glu Asp Lys
            195                 200                 205

Thr Met Ala Pro Ala Arg Gly Gln Ile Val Val Arg Asn Glu Ser
            210                 215                 220

Ser Pro Met Leu Leu Thr Ser Gly Val Glu Asp Gly Gly Ala Asp Val
225                 230                 235                 240

Met Tyr Leu Met Gln Arg Ala Ala Gly Gly Thr Ile Leu Gly Gly
                    245                 250                 255

Thr Tyr Asp Val Gly Asn Trp Glu Ser Gln Pro Asp Pro Asn Ile Ala
            260                 265                 270

Asn Arg Ile Met Gln Arg Ile Val Glu Val Arg Pro Glu Ile Ala Asn
            275                 280                 285

Gly Lys Gly Val Lys Gly Leu Ser Val Ile Arg His Ala Val Gly Met
            290                 295                 300

Arg Pro Trp Arg Lys Asp Gly Val Arg Ile Glu Glu Lys Leu Asp
305                 310                 315                 320

Asp Glu Thr Trp Ile Val His Asn Tyr Gly His Ser Gly Trp Gly Tyr
                    325                 330                 335

Gln Gly Ser Tyr Gly Cys Ala Glu Asn Val Val Gln Leu Val Asp Lys
            340                 345                 350

Val Gly Lys Ala Ala Lys Ser Lys Leu
            355                 360

<210> SEQ ID NO 2
<211> LENGTH: 361
<212> TYPE: PRT
<213> ORGANISM: Homo sapiens

<400> SEQUENCE: 2

Met Ala Asn Thr Ile Val Val Gly Ala Gly Val Ser Gly Leu Thr
1               5                   10                  15

Ser Ala Tyr Leu Leu Ser Lys Asn Lys Gly Asn Lys Ile Thr Val Val
                20                  25                  30

Ala Lys His Met Pro Gly Asp Tyr Asp Ile Glu Tyr Ala Ser Pro Phe
            35                  40                  45

Ala Gly Ala Asn Val Cys Pro Met Ala Thr Gln Glu Asn Ser Arg Trp
50                  55                  60

Glu Arg Arg Thr Trp Val Glu Phe Lys Arg Leu Cys Glu Gln Val Pro
65                  70                  75                  80

Glu Ala Gly Ile His Phe Gln Lys Cys His Ile Ala Arg Arg Lys Lys
                85                  90                  95

Asp Val Glu Glu Ala Lys Ser Ser Thr Phe Pro Asp Ala Leu Phe Gln
            100                 105                 110

Glu Glu Pro Trp Tyr Lys Glu Leu Phe Glu Asp Phe Arg Glu Gln Asn
        115                 120                 125

Pro Asn Glu Val Thr Arg Gly Tyr Asp Ser Gly Cys Glu Phe Thr Ser
    130                 135                 140

Val Cys Ile Asn Thr Ala Ile Tyr Leu Pro Trp Leu Ala Gly Gln Cys
145                 150                 155                 160

Leu Lys Asn Gly Val Val Leu Lys Arg Thr Ile Leu Thr Asp Ile Ser
                165                 170                 175

Glu Ala Lys Lys Leu Ser His Thr Gly Lys Val Pro Asn Ile Ile Val
            180                 185                 190

Asn Ala Thr Gly Leu Gly Ser Leu Lys Leu Gly Gly Val Lys Asp Glu
        195                 200                 205

Thr Met Ala Pro Ala Arg Gly Gln Ile Val Val Arg Asn Glu Ser
    210                 215                 220

Thr Pro Met Leu Ile Thr Ser Gly Val Glu Asp Gly Gly Ser Asp Val
225                 230                 235                 240

Met Tyr Leu Met Gln Arg Ala Ala Gly Gly Thr Ile Leu Gly Gly
                245                 250                 255

Thr Tyr Asp Val Gly Asn Trp Glu Ser Gln Pro Asp Pro Asn Ile Ala
            260                 265                 270

Gln Arg Ile Met Gln Arg Ile Val Glu Ala Arg Pro Glu Val Ala Asp
        275                 280                 285

Gly Lys Gly Val Lys Gly Leu Ser Ile Ile Arg His Ala Val Gly Leu
    290                 295                 300

Arg Pro Trp Arg Lys Gly Gly Leu Arg Leu Glu Glu Glu Lys Leu Asp
305                 310                 315                 320

Asp Glu Thr Trp Ile Val His Asn Tyr Gly His Ser Gly Trp Gly Tyr
                325                 330                 335

Gln Gly Ser Tyr Gly Cys Ala Glu Gly Val Val Glu Leu Val Asp Lys
            340                 345                 350

Val Gly Lys Gly Ala Lys Ala Lys Leu
        355                 360

<210> SEQ ID NO 3

<211> LENGTH: 361
<212> TYPE: PRT
<213> ORGANISM: Homo sapiens

<400> SEQUENCE: 3

Met Ala Asn Thr Ile Val Val Gly Ala Gly Val Ser Gly Leu Thr
1               5                   10                  15

Ser Ala Tyr Leu Leu Ser Lys Asn Lys Gly Asn Lys Ile Thr Val Val
            20                  25                  30

Gly Lys His Met Pro Gly Asp Tyr Asp Ile Glu Tyr Ala Ser Pro Phe
                35                  40                  45

Ala Gly Ala Asn Val Cys Pro Met Ala Thr Gln Glu Asn Ser Arg Trp
50                  55                  60

Glu Arg Arg Thr Trp Val Glu Phe Lys Arg Leu Cys Glu Gln Val Pro
65                  70                  75                  80

Glu Ala Gly Ile His Phe Gln Lys Cys Asn Ile Ala Arg Arg Lys Lys
                85                  90                  95

Asp Val Glu Glu Ala Lys Ser Asn Thr Phe Pro Asp Ala Leu Phe Gln
            100                 105                 110

Glu Glu Pro Trp Tyr Lys Glu Leu Phe Glu Asp Phe Arg Glu Leu Asn
        115                 120                 125

Pro Ser Glu Val Thr Arg Gly Tyr Asp Thr Gly Cys Glu Phe Thr Ser
130                 135                 140

Val Cys Ile Asn Thr Ala Ile Tyr Leu Pro Trp Leu Ala Gly Gln Cys
145                 150                 155                 160

Leu Lys Lys Gly Val Val Ile Lys Arg Ala Ser Leu Thr Asp Ile Ser
                165                 170                 175

Glu Ala Lys Lys Leu Ser His Thr Gly Asn Val Pro Asn Ile Ile Val
            180                 185                 190

Asn Ala Thr Gly Leu Gly Ser Leu Lys Leu Gly Gly Val Lys Asp Glu
        195                 200                 205

Thr Met Ala Pro Ala Arg Gly Gln Ile Val Val Arg Asn Glu Ser
210                 215                 220

Thr Pro Met Leu Ile Thr Ser Gly Val Glu Asp Gly Ser Asp Val
225                 230                 235                 240

Met Tyr Leu Met Gln Arg Ala Ala Gly Gly Thr Ile Leu Gly Gly
                245                 250                 255

Thr Tyr Asp Ile Gly Asn Trp Glu Ser Gln Pro Asp Pro Asn Val Ala
            260                 265                 270

Gln Arg Ile Leu Gln Arg Ile Val Glu Ala Arg Pro Glu Val Ala Asp
        275                 280                 285

Gly Lys Gly Val Lys Gly Leu Ser Ile Ile Arg His Ala Val Gly Leu
290                 295                 300

Arg Pro Trp Arg Lys Asp Gly Leu Arg Leu Glu Glu Glu Lys Leu Asp
305                 310                 315                 320

Asp Glu Thr Trp Ile Val His Asn Tyr Gly His Ser Gly Trp Gly Tyr
                325                 330                 335

Gln Gly Ser Tyr Gly Cys Ala Glu Gly Val Val Glu Leu Val Asp Lys
            340                 345                 350

Val Gly Lys Gly Ala Lys Ala Lys Leu
        355                 360

<210> SEQ ID NO 4
<211> LENGTH: 356
<212> TYPE: PRT

<213> ORGANISM: Homo sapiens

<400> SEQUENCE: 4

```
Met Ala Lys Ile Val Ile Gly Ala Gly Val Ala Gly Leu Thr Thr
1               5                   10                  15

Ala Leu Gln Leu Leu Arg Lys Gly His Glu Val Thr Ile Val Ser Glu
            20                  25                  30

Phe Thr Pro Gly Asp Leu Ser Ile Gly Tyr Thr Ser Pro Trp Ala Gly
            35                  40                  45

Ala Asn Trp Leu Thr Phe Tyr Asp Gly Gly Lys Leu Ala Asp Tyr Asp
            50                  55                  60

Ala Val Ser Tyr Pro Ile Leu Arg Glu Leu Ala Arg Ser Ser Pro Glu
65                  70                  75                  80

Ala Gly Ile Arg Leu Ile Ser Gln Arg Ser His Val Leu Lys Arg Asp
            85                  90                  95

Leu Pro Lys Leu Glu Val Ala Met Ser Ala Ile Cys Gln Arg Asn Pro
            100                 105                 110

Trp Phe Lys Asn Thr Val Asp Ser Phe Glu Ile Ile Glu Asp Arg Ser
            115                 120                 125

Arg Ile Val His Asp Asp Val Ala Tyr Leu Val Glu Phe Arg Ser Val
130                 135                 140

Cys Ile His Thr Gly Val Tyr Leu Asn Trp Leu Met Ser Gln Cys Leu
145                 150                 155                 160

Ser Leu Gly Ala Thr Val Val Lys Arg Arg Val Asn His Ile Lys Asp
                165                 170                 175

Ala Asn Leu Leu His Ser Ser Gly Ser Arg Pro Asp Val Ile Val Asn
                180                 185                 190

Cys Ser Gly Leu Phe Ala Arg Phe Leu Gly Gly Val Glu Asp Lys Lys
                195                 200                 205

Met Tyr Pro Ile Arg Gly Gln Val Val Leu Val Arg Asn Ser Leu Pro
210                 215                 220

Phe Met Ala Ser Phe Ser Ser Thr Pro Glu Lys Glu Asn Glu Asp Glu
225                 230                 235                 240

Ala Leu Tyr Ile Met Thr Arg Phe Asp Gly Thr Ser Ile Ile Gly Gly
                245                 250                 255

Cys Phe Gln Pro Asn Asn Trp Ser Ser Glu Pro Asp Pro Ser Leu Thr
                260                 265                 270

His Arg Ile Leu Ser Arg Ala Leu Asp Arg Phe Pro Glu Leu Thr Lys
                275                 280                 285

Asp Gly Pro Leu Asp Ile Val Arg Glu Cys Val Gly His Arg Pro Gly
290                 295                 300

Arg Glu Gly Gly Pro Arg Val Glu Leu Glu Lys Ile Pro Gly Val Gly
305                 310                 315                 320

Phe Val Val His Asn Tyr Gly Ala Ala Gly Ala Gly Tyr Gln Ser Ser
                325                 330                 335

Tyr Gly Met Ala Asp Glu Ala Val Ser Tyr Val Glu Arg Ala Leu Thr
                340                 345                 350

Arg Pro Asn Leu
            355
```

<210> SEQ ID NO 5
<211> LENGTH: 341
<212> TYPE: PRT
<213> ORGANISM: Homo sapiens

<400> SEQUENCE: 5

Met Ser Ala Pro Ser Thr Ser Thr Val Arg Val Pro Phe Thr Glu
1               5                   10                  15

Leu Gln Ser Leu Leu Gln Ala Ile Phe Gln Arg His Gly Cys Ser Glu
            20                  25                  30

Ala Val Ala Arg Val Leu Ala His Asn Cys Ala Ser Ala Gln Arg Asp
        35                  40                  45

Gly Ala His Ser His Gly Val Phe Arg Met Pro Gly Tyr Val Ser Thr
    50                  55                  60

Leu Ala Ser Gly Trp Val Asp Gly Gln Ala Thr Pro Gln Val Ser Asp
65                  70                  75                  80

Val Ala Ala Gly Tyr Val Arg Val Asp Ala Ala Gly Gly Phe Ala Gln
                85                  90                  95

Pro Ala Leu Ala Ala Arg Glu Leu Leu Val Ala Lys Ala Arg Ser
            100                 105                 110

Ala Gly Ile Ala Val Leu Ala Ile His Asn Ser His His Phe Ala Ala
        115                 120                 125

Leu Trp Pro Asp Val Glu Pro Phe Ala Glu Glu Gly Leu Val Ala Leu
    130                 135                 140

Ser Val Val Asn Ser Met Thr Cys Val Val Pro His Gly Ala Arg Lys
145                 150                 155                 160

Pro Leu Phe Gly Thr Asn Pro Ile Ala Phe Ala Ala Pro Cys Ala Glu
                165                 170                 175

His Asp Pro Ile Val Phe Asp Met Ala Thr Ser Ala Met Ala His Gly
            180                 185                 190

Asp Val Gln Ile Ala Ala Arg Ala Gly Gln Gln Leu Pro Glu Gly Met
        195                 200                 205

Gly Val Asp Ala Asp Gly Gln Pro Thr Thr Asp Pro Lys Ala Ile Leu
    210                 215                 220

Glu Gly Gly Ala Leu Leu Pro Phe Gly Gly His Lys Gly Ser Ala Leu
225                 230                 235                 240

Ser Met Met Val Glu Leu Leu Ala Ala Ala Leu Thr Gly Gly His Phe
                245                 250                 255

Ser Trp Glu Phe Asp Trp Ser Gly His Pro Gly Ala Lys Thr Pro Trp
            260                 265                 270

Thr Gly Gln Leu Ile Ile Val Ile Asp Pro Gly Lys Ala Glu Gly Gln
        275                 280                 285

Arg Phe Ala Gln Arg Ser Arg Glu Leu Val Glu His Met Gln Ala Val
    290                 295                 300

Gly Leu Thr Arg Met Pro Gly Glu Arg Arg Tyr Arg Glu Arg Glu Val
305                 310                 315                 320

Ala Glu Glu Glu Gly Val Ala Val Thr Glu Gln Glu Leu Lys Gly Leu
                325                 330                 335

Lys Glu Leu Leu Gly
            340

<210> SEQ ID NO 6
<211> LENGTH: 334
<212> TYPE: PRT
<213> ORGANISM: Homo sapiens

<400> SEQUENCE: 6

Met Ile Arg Met Thr Leu Asp Glu Val Arg Glu Leu Ala Val Arg Ile
1               5                   10                  15

```
Leu Arg Arg His Ala Phe Ser Glu Ala His Val Gln Ala Val Ala Asp
             20                  25                  30

Thr Leu Val Ala Gly Glu Arg Asp Glu Cys Ala Ser His Gly Ile Trp
         35                  40                  45

Arg Leu Leu Gly Cys Ile Ala Thr Leu Lys Ala Gly Lys Val Ser Ala
     50                  55                  60

Asp Ala Glu Pro Glu Leu His Asp Ile Ala Pro Gly Leu Leu Arg Val
65                  70                  75                  80

Asp Ala His Gly Gly Phe Ser Gln Cys Ala Phe Arg Leu Gly Leu Pro
                 85                  90                  95

His Leu Leu Glu Lys Ala Arg Ser Gln Gly Ile Ala Ala Met Ala Val
            100                 105                 110

Asn Arg Cys Val His Phe Ser Ala Leu Trp Val Glu Val Glu Ala Leu
        115                 120                 125

Thr Glu Ala Gly Leu Val Ala Leu Ala Thr Thr Pro Ser His Ala Trp
    130                 135                 140

Val Ala Pro Ala Gly Gly Arg Lys Pro Ile Phe Gly Thr Asn Pro Ile
145                 150                 155                 160

Ala Phe Gly Trp Pro Arg Pro Asp Gly Pro Pro Phe Val Phe Asp Phe
                165                 170                 175

Ala Thr Ser Ala Val Ala Arg Gly Glu Ile Gln Leu His Glu Arg Ala
            180                 185                 190

Gly Lys Pro Ile Pro Leu Gly Trp Gly Val Asp Glu Gln Gly Glu Pro
        195                 200                 205

Thr Thr Asp Ala Ser Ala Ala Leu Arg Gly Ala Met Leu Thr Phe Gly
    210                 215                 220

Gly His Lys Gly Ser Ala Leu Ala Ala Met Val Glu Leu Leu Ala Gly
225                 230                 235                 240

Pro Leu Ile Gly Asp Leu Thr Ser Ala Glu Ser Leu Ala Tyr Asp Glu
                245                 250                 255

Gly Ser Arg Ser Ser Pro Tyr Gly Gly Glu Leu Leu Ile Ala Ile Asp
            260                 265                 270

Pro Arg Arg Met Leu Gly Ala Ser Ala Glu Glu His Leu Ala Arg Ala
        275                 280                 285

Glu Thr Leu Phe Glu Gly Ile Val Glu Gln Gly Ala Arg Leu Pro Ser
    290                 295                 300

Gln Arg Arg Phe Glu Ala Arg Glu Arg Ser Ala Arg Asp Gly Val Thr
305                 310                 315                 320

Ile Pro Glu Ala Leu His Arg Glu Leu Leu Ala Leu Leu Glu
                325                 330

<210> SEQ ID NO 7
<211> LENGTH: 343
<212> TYPE: PRT
<213> ORGANISM: Homo sapiens

<400> SEQUENCE: 7

Met Ser Ala Pro His Asp His Ala Ile Ser Ser Thr Val Ser Leu Asp
1               5                   10                  15

Glu Leu Thr Gln Leu Leu Glu Thr Ile Phe Thr Arg His Gly Thr Ser
            20                  25                  30

Ala Glu Val Ala Arg Thr Leu Ala Thr Asn Cys Ala Asn Ala Glu Arg
        35                  40                  45

Asp Gly Ala His Ser His Gly Val Phe Arg Ile Pro Gly Tyr Val Ser
    50                  55                  60
```

```
Thr Leu Asn Ser Gly Trp Val Asn Gly Lys Ala Val Pro Lys Val Glu
 65                  70                  75                  80

Asp Val Ala Ser Gly Phe Val Ser Val Asp Ala Gly Asn Gly Phe Ala
                 85                  90                  95

Gln Pro Ala Leu Ala Ala Arg Pro Leu Val Glu Lys Ala Arg
            100                 105                 110

Ser Ala Gly Ile Ala Val Leu Ala Ile Arg Asn Ser His His Phe Ala
            115                 120                 125

Ala Leu Trp Pro Asp Val Glu Pro Phe Ala Asp Glu Gly Leu Val Ala
130                 135                 140

Leu Ser Val Val Asn Ser Met Thr Cys Val Val Pro His Gly Ala Asp
145                 150                 155                 160

Arg Pro Leu Phe Gly Thr Asn Pro Ile Ala Phe Ala Ala Pro Arg Ala
                165                 170                 175

Asp Gly Ala Pro Ile Val Phe Asp Leu Ala Thr Ser Ala Ile Ala His
                180                 185                 190

Gly Asp Val Gln Ile Ala Ala Arg Lys Gly Glu Lys Leu Pro Ala Gly
            195                 200                 205

Met Gly Val Asp Ser Leu Gly Gln Pro Thr Cys Asp Pro Lys Ala Ile
210                 215                 220

Leu Glu Gly Gly Ala Leu Leu Pro Phe Gly His Lys Gly Ser Ala
225                 230                 235                 240

Leu Ser Met Met Val Glu Leu Ala Ala Ala Leu Thr Gly Asn
                245                 250                 255

Phe Ser Phe Glu Phe Asp Trp Lys Asn His Pro Gly Ala Lys Thr Pro
                260                 265                 270

Trp Thr Gly Gln Leu Leu Ile Val Ile Asp Pro Ser Lys Thr Ala Gly
            275                 280                 285

Gln Ser Phe Ala Glu Arg Ser Gln Glu Leu Val Arg Gln Met His Gly
            290                 295                 300

Val Gly Leu Lys Arg Leu Pro Gly Asp Arg Arg His Leu Gln Arg Thr
305                 310                 315                 320

Lys Ser Leu Val Lys Gly Ile Glu Leu Asp Gln Gln Thr Leu Ser Gln
                325                 330                 335

Leu Arg Glu Leu Ala Gly Glu
            340

<210> SEQ ID NO 8
<211> LENGTH: 332
<212> TYPE: PRT
<213> ORGANISM: Homo sapiens

<400> SEQUENCE: 8

Met Arg Val Ala Phe Asn Glu Leu Gln Val Leu Leu Gln Ser Ile Phe
  1               5                  10                  15

Glu Arg His Gly Cys Ser Ala Val Ala Ala Val Leu Ala His Asn
                 20                  25                  30

Cys Ala Ser Ala Gln Arg Asp Gly Ala His Ser His Gly Val Phe Arg
             35                  40                  45

Ile Pro Gly Tyr Val Ser Thr Leu Ala Ser Gly Trp Val Asp Gly Arg
         50                  55                  60

Ala Glu Pro Gln Val Thr Asp Leu Ala Ser Gly Tyr Val Arg Val Asp
 65                  70                  75                  80

Ala Lys Gly Gly Phe Ala Gln Pro Ala Leu Ala Ala Ala Arg Pro Leu
```

```
              85                  90                  95
Leu Met Glu Lys Ala Arg Ala Ala Gly Ile Ala Val Leu Ala Ile His
            100                 105                 110

Asn Ser His His Phe Ala Ala Leu Trp Pro Asp Val Glu Pro Phe Ala
        115                 120                 125

Asp Glu Gly Leu Val Ala Leu Ser Val Val Asn Ser Met Thr Cys Val
    130                 135                 140

Val Pro His Gly Ala Arg Lys Pro Leu Phe Gly Thr Asn Pro Ile Ala
145                 150                 155                 160

Phe Ala Ala Pro Cys Ala Gly His Asp Pro Ile Val Phe Asp Met Ala
                165                 170                 175

Thr Ser Ala Met Ala His Gly Asp Val Gln Ile Ala Ala Arg Ala Gly
            180                 185                 190

Glu Gln Leu Pro Pro Gly Ile Gly Val Asp Ala Ala Gly Gln Pro Thr
        195                 200                 205

Thr Asp Pro Lys Ala Ile Leu Glu Gly Gly Ala Leu Leu Pro Phe Gly
    210                 215                 220

Gly His Lys Gly Ser Ala Leu Ser Met Met Val Glu Leu Leu Ala Ala
225                 230                 235                 240

Ala Leu Thr Gly Gly Asn Phe Ser Trp Glu Phe Asp Trp Ala Gln His
                245                 250                 255

Pro Gly Ala Lys Thr Pro Trp Thr Gly Gln Leu Ile Ile Val Ile Asp
            260                 265                 270

Pro Ser Lys Ala Glu Gly Glu Arg Phe Ala Leu Arg Ser Arg Glu Leu
        275                 280                 285

Val Glu Gln Met Gln Val Ala Gly Leu Thr Arg Met Pro Gly Glu Arg
    290                 295                 300

Arg Tyr Arg Glu Arg Val Ala Gly Arg Gly Val Ala Leu Gly
305                 310                 315                 320

Glu Arg Glu Leu Ala Glu Leu Lys Ala Leu Ala Arg
                325                 330

<210> SEQ ID NO 9
<211> LENGTH: 261
<212> TYPE: PRT
<213> ORGANISM: Homo sapiens

<400> SEQUENCE: 9

Met Tyr Pro Asp Leu Lys Gly Lys Val Val Ala Ile Thr Gly Ala Ala
1               5                   10                  15

Ser Gly Leu Gly Lys Ala Met Ala Ile Arg Phe Gly Lys Glu Gln Ala
            20                  25                  30

Lys Val Val Ile Asn Tyr Tyr Ser Asn Lys Gln Asp Pro Asn Glu Val
        35                  40                  45

Lys Glu Glu Val Ile Lys Ala Gly Gly Glu Ala Val Val Val Gln Gly
    50                  55                  60

Asp Val Thr Lys Glu Glu Asp Val Lys Asn Ile Val Gln Thr Ala Ile
65                  70                  75                  80

Lys Glu Phe Gly Thr Leu Asp Ile Met Ile Asn Asn Ala Gly Leu Glu
                85                  90                  95

Asn Pro Val Pro Ser His Glu Met Pro Leu Lys Asp Trp Asp Lys Val
            100                 105                 110

Ile Gly Thr Asn Leu Thr Gly Ala Phe Leu Gly Ser Arg Glu Ala Ile
        115                 120                 125
```

-continued

Lys Tyr Phe Val Glu Asn Asp Ile Lys Gly Asn Val Ile Asn Met Ser
    130                 135                 140

Ser Val His Glu Val Ile Pro Trp Pro Leu Phe Val His Tyr Ala Ala
145                 150                 155                 160

Ser Lys Gly Gly Ile Lys Leu Met Thr Glu Thr Leu Ala Leu Glu Tyr
                165                 170                 175

Ala Pro Lys Gly Ile Arg Val Asn Asn Ile Gly Pro Gly Ala Ile Asn
            180                 185                 190

Thr Pro Ile Asn Ala Glu Lys Phe Ala Asp Pro Lys Gln Lys Ala Asp
        195                 200                 205

Val Glu Ser Met Ile Pro Met Gly Tyr Ile Gly Glu Pro Glu Glu Ile
210                 215                 220

Ala Ala Val Ala Ala Trp Leu Ala Ser Lys Glu Ala Ser Tyr Val Thr
225                 230                 235                 240

Gly Ile Thr Leu Phe Ala Asp Gly Gly Met Thr Gln Tyr Pro Ser Phe
                245                 250                 255

Gln Ala Gly Arg Gly
            260

<210> SEQ ID NO 10
<211> LENGTH: 252
<212> TYPE: PRT
<213> ORGANISM: Homo sapiens

<400> SEQUENCE: 10

Met Thr Asp Arg Leu Lys Gly Lys Val Ala Ile Val Thr Gly Gly Thr
1               5                   10                  15

Leu Gly Ile Gly Leu Ala Ile Ala Asp Lys Phe Val Glu Glu Gly Ala
            20                  25                  30

Lys Val Val Ile Thr Gly Arg His Ala Asp Val Gly Glu Lys Ala Ala
        35                  40                  45

Lys Ser Ile Gly Gly Thr Asp Val Ile Arg Phe Val Gln His Asp Ala
    50                  55                  60

Ser Asp Glu Ala Gly Trp Thr Lys Leu Phe Asp Thr Thr Glu Glu Ala
65                  70                  75                  80

Phe Gly Pro Val Thr Thr Val Val Asn Asn Ala Gly Ile Ala Val Ser
                85                  90                  95

Lys Ser Val Glu Asp Thr Thr Thr Glu Glu Trp Arg Lys Leu Leu Ser
            100                 105                 110

Val Asn Leu Asp Gly Val Phe Phe Gly Thr Arg Leu Gly Ile Gln Arg
        115                 120                 125

Met Lys Asn Lys Gly Leu Gly Ala Ser Ile Ile Asn Met Ser Ser Ile
    130                 135                 140

Glu Gly Phe Val Gly Asp Pro Thr Leu Gly Ala Tyr Asn Ala Ser Lys
145                 150                 155                 160

Gly Ala Val Arg Ile Met Ser Lys Ser Ala Ala Leu Asp Cys Ala Leu
                165                 170                 175

Lys Asp Tyr Asp Val Arg Val Asn Thr Val His Pro Gly Tyr Ile Lys
            180                 185                 190

Thr Pro Leu Val Asp Asp Leu Glu Gly Ala Glu Met Met Ser Gln
        195                 200                 205

Arg Thr Lys Thr Pro Met Gly His Ile Gly Glu Pro Asn Asp Ile Ala
    210                 215                 220

Trp Ile Cys Val Tyr Leu Ala Ser Asp Glu Ser Lys Phe Ala Thr Gly
225                 230                 235                 240

```
Ala Glu Phe Val Val Asp Gly Gly Tyr Thr Ala Gln
                245                 250
```